(12) United States Patent
Simonetti et al.

(10) Patent No.: US 12,203,184 B2
(45) Date of Patent: Jan. 21, 2025

(54) MULTI-CHAMBERED ELECTROCHEMICAL CELL FOR CARBON DIOXIDE REMOVAL

(71) Applicant: The Regents of the University of California, Oakland, CA (US)

(72) Inventors: Dante Simonetti, Los Angeles, CA (US); Gaurav Sant, Los Angeles, CA (US); David Jassby, Los Angeles, CA (US); Yenwen Tseng, Los Angeles, CA (US); Andrew Liotta, Los Angeles, CA (US); John Buttles, Los Angeles, CA (US); Maryam Haddad, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 18/223,460

(22) Filed: Jul. 18, 2023

(65) Prior Publication Data

US 2024/0018669 A1    Jan. 18, 2024

Related U.S. Application Data

(60) Provisional application No. 63/390,123, filed on Jul. 18, 2022.

(51) Int. Cl.
*C25B 3/09* (2021.01)
*B01D 53/32* (2006.01)
(Continued)

(52) U.S. Cl.
CPC ............. *C25B 3/09* (2021.01); *B01D 53/326* (2013.01); *B01D 61/445* (2013.01); *C25B 9/19* (2021.01);
(Continued)

(58) Field of Classification Search
None
See application file for complete search history.

(56) References Cited

U.S. PATENT DOCUMENTS 2,117,348 A    5/1938    Muskat
2,802,719 A    8/1957    Avedikian
(Continued)

FOREIGN PATENT DOCUMENTS

AU    2005/290082 B2    3/2011
CN    111760436 A    10/2020
(Continued)

OTHER PUBLICATIONS

Nagasawa et al, A new recovery process of carbon dioxide from alkaline carbonate solution via electrodialysis, AIChE Environmental and Energy Engineering, vol. 55, No. 12, Dec. 2009, pp. 3286-3293 (Year: 2009).*

(Continued)

*Primary Examiner* — Harry D Wilkins, III
(74) *Attorney, Agent, or Firm* — Foley Hoag LLP; David P. Halstead; Alexander J. Chatterley

(57) ABSTRACT

A system for a multi-chambered electrochemical cell for carbon dioxide removal includes an electrochemical cell. The electrochemical cell includes an anodic chamber at a first end of the electrochemical cell, which includes an anode. The electrochemical cell includes an acid swing chamber adjacent to the anodic chamber and separated by a cation exchange membrane. The electrochemical cell includes a desalination chamber separated from the acid swing chamber by a anion exchange membrane. The electrochemical cell includes a base swing chamber in fluid communication with the acid swing chamber and the desalination chamber. The base swing chamber is adjacent to the desalination chamber and separated by a cation exchange membrane. The electrochemical cell includes a cathodic (Continued)

chamber at a second end of the electrochemical cell, the cathodic chamber comprising a cathode, wherein the cathodic chamber is adjacent to the base swing chamber and separated by a second anion exchange membrane.

15 Claims, 13 Drawing Sheets

(51) Int. Cl.
  *B01D 61/44*  (2006.01)
  *C25B 9/19*  (2021.01)
  *C25B 9/70*  (2021.01)
  *C25B 15/08*  (2006.01)
(52) U.S. Cl.
  CPC .............. *C25B 9/70* (2021.01); *C25B 15/083* (2021.01); *B01D 2257/504* (2013.01)

(56) References Cited

U.S. PATENT DOCUMENTS

| | | | |
|---|---|---|---|
| 4,318,996 A | 3/1982 | Magder | |
| 4,379,870 A | 4/1983 | Matsumoto | |
| 4,391,680 A * | 7/1983 | Mani | C25B 1/46 |
| | | | 205/346 |
| 4,432,666 A | 2/1984 | Frey et al. | |
| 4,452,635 A | 6/1984 | Noshi et al. | |
| 4,828,620 A | 5/1989 | Mallow et al. | |
| 5,435,846 A | 7/1995 | Tatematsu et al. | |
| 5,455,013 A | 10/1995 | Shibata et al. | |
| 5,518,540 A | 5/1996 | Jones, Jr. | |
| 5,744,078 A | 4/1998 | Soroushian et al. | |
| 5,798,328 A | 8/1998 | Kottwitz et al. | |
| 5,928,420 A | 7/1999 | Oates et al. | |
| 6,264,736 B1 | 7/2001 | Knopf et al. | |
| 6,569,923 B1 | 5/2003 | Slagter | |
| 7,413,014 B2 | 8/2008 | Chatterji et al. | |
| 7,879,305 B2 | 2/2011 | Reddy et al. | |
| 8,021,477 B2 | 9/2011 | Brown et al. | |
| 8,088,292 B2 | 1/2012 | Neumann et al. | |
| 8,163,066 B2 | 4/2012 | Eisenberger | |
| 8,252,242 B2 | 8/2012 | Vandor | |
| 8,262,777 B2 | 9/2012 | Neumann et al. | |
| 8,333,944 B2 | 12/2012 | Constantz et al. | |
| 8,383,072 B2 | 2/2013 | Smedley et al. | |
| 8,507,228 B2 | 8/2013 | Simpson et al. | |
| 8,852,319 B2 | 10/2014 | Wijmans et al. | |
| 8,864,876 B2 | 10/2014 | Neumann et al. | |
| 8,894,747 B2 | 11/2014 | Eisenberger et al. | |
| 9,061,237 B2 | 6/2015 | Eisenberger et al. | |
| 9,163,297 B2 | 10/2015 | Langley | |
| 9,205,371 B2 | 12/2015 | Cooper et al. | |
| 9,221,027 B2 | 12/2015 | Kuppler et al. | |
| 9,227,153 B2 | 1/2016 | Eisenberger | |
| 9,382,120 B2 | 7/2016 | Dakhil | |
| 9,382,157 B2 | 7/2016 | Guzzetta et al. | |
| 9,433,886 B2 | 9/2016 | Smedley et al. | |
| 9,440,189 B2 | 9/2016 | Mercier et al. | |
| 9,469,547 B2 | 10/2016 | Kniesburges | |
| 9,475,000 B2 | 10/2016 | Benyahia | |
| 9,492,945 B2 | 11/2016 | Niven et al. | |
| 9,555,365 B2 | 1/2017 | Eisenberger et al. | |
| 9,714,406 B2 | 7/2017 | Constantz et al. | |
| 9,786,940 B2 | 10/2017 | Langley | |
| 9,789,439 B2 | 10/2017 | Siller et al. | |
| 9,790,131 B2 | 10/2017 | Lee et al. | |
| 9,808,759 B2 | 11/2017 | Balfe et al. | |
| 9,861,931 B2 | 1/2018 | Kuopanportti et al. | |
| 10,010,829 B2 | 7/2018 | Wright et al. | |
| 10,017,739 B2 | 7/2018 | Tedder et al. | |
| 10,233,127 B2 | 3/2019 | Atakan | |
| 10,351,478 B2 | 7/2019 | Quinn et al. | |
| 10,392,305 B2 | 8/2019 | Wang et al. | |
| 10,668,443 B2 | 6/2020 | Kuppler et al. | |
| 10,781,140 B2 | 9/2020 | Patten et al. | |
| 10,968,142 B2 | 4/2021 | Sant et al. | |
| 11,040,898 B2 | 6/2021 | Sant et al. | |
| 11,230,473 B2 | 1/2022 | Sant et al. | |
| 11,339,094 B2 | 5/2022 | Sant et al. | |
| 11,384,029 B2 | 7/2022 | Sant et al. | |
| 2001/0023655 A1 | 9/2001 | Knopf | |
| 2002/0158018 A1 | 10/2002 | Abramowitz et al. | |
| 2002/0168473 A1 | 11/2002 | Ottersbach | |
| 2004/0077787 A1 | 4/2004 | Karande | |
| 2005/0238563 A1 | 10/2005 | Eighmy et al. | |
| 2006/0247450 A1 | 11/2006 | Wu et al. | |
| 2007/0186821 A1 | 8/2007 | Brown et al. | |
| 2007/0187247 A1 * | 8/2007 | Lackner | B01D 61/445 |
| | | | 204/627 |
| 2008/0004449 A1 | 1/2008 | Yong et al. | |
| 2008/0156232 A1 | 7/2008 | Crudden | |
| 2008/0245274 A1 | 10/2008 | Ramme | |
| 2008/0245672 A1 | 10/2008 | Little et al. | |
| 2009/0081096 A1 | 3/2009 | Pellegrin | |
| 2009/0169452 A1 | 7/2009 | Constantz et al. | |
| 2009/0214408 A1 | 8/2009 | Blake et al. | |
| 2010/0059377 A1 * | 3/2010 | Littau | C02F 1/4693 |
| | | | 204/627 |
| 2010/0083880 A1 | 4/2010 | Constantz et al. | |
| 2010/0251632 A1 | 10/2010 | Chen | |
| 2010/0300894 A1 * | 12/2010 | Lin | B01D 61/485 |
| | | | 204/258 |
| 2011/0006700 A1 | 1/2011 | Chen et al. | |
| 2011/0033239 A1 | 2/2011 | Constantz et al. | |
| 2011/0042230 A1 * | 2/2011 | Gilliam | C25B 1/22 |
| | | | 205/555 |
| 2011/0174156 A1 | 7/2011 | Saunders et al. | |
| 2011/0268633 A1 | 11/2011 | Zou | |
| 2011/0290155 A1 | 12/2011 | Vlasopoulos | |
| 2012/0082839 A1 | 4/2012 | Ha | |
| 2013/0008355 A1 | 1/2013 | Stokes | |
| 2013/0036945 A1 | 2/2013 | Constantz et al. | |
| 2013/0058857 A1 | 3/2013 | Stern et al. | |
| 2014/0097557 A1 | 4/2014 | Alhozaimy | |
| 2014/0197563 A1 | 7/2014 | Niven | |
| 2014/0356267 A1 | 12/2014 | Hunwick | |
| 2015/0021184 A1 | 1/2015 | Lin et al. | |
| 2015/0225295 A1 | 8/2015 | McCandlish et al. | |
| 2016/0082387 A1 | 3/2016 | Constantz et al. | |
| 2016/0280598 A1 | 9/2016 | Wang et al. | |
| 2016/0362800 A1 | 12/2016 | Ren et al. | |
| 2017/0182458 A1 | 6/2017 | Jiang et al. | |
| 2017/0226021 A1 | 8/2017 | Sant et al. | |
| 2018/0238157 A1 | 8/2018 | Fu et al. | |
| 2018/0341887 A1 | 11/2018 | Kislovskiy et al. | |
| 2019/0177220 A1 | 6/2019 | Sant et al. | |
| 2019/0232215 A1 | 8/2019 | Fujita et al. | |
| 2019/0367390 A1 | 12/2019 | Sant et al. | |
| 2020/0038803 A1 * | 2/2020 | Xu | B01D 53/1475 |
| 2020/0062645 A1 | 2/2020 | Gong et al. | |
| 2020/0129916 A1 | 4/2020 | Constantz et al. | |
| 2020/0180964 A1 | 6/2020 | Sant et al. | |
| 2020/0299203 A1 | 9/2020 | Sant et al. | |
| 2021/0024364 A1 | 1/2021 | Sant et al. | |
| 2021/0031154 A1 | 2/2021 | Nakamura et al. | |
| 2021/0060484 A1 | 3/2021 | Aziz et al. | |
| 2021/0107840 A1 | 4/2021 | Gong | |
| 2021/0120750 A1 | 4/2021 | Bourhis et al. | |
| 2021/0162340 A1 | 6/2021 | Constantz et al. | |
| 2021/0188671 A1 | 6/2021 | Sant et al. | |
| 2021/0198157 A1 | 7/2021 | Sant et al. | |
| 2021/0262320 A1 | 8/2021 | Nguyen et al. | |
| 2021/0285111 A1 * | 9/2021 | Fernandez | C25B 1/00 |
| 2021/0387139 A1 | 12/2021 | Voskian et al. | |
| 2022/0064066 A1 | 3/2022 | Sant et al. | |
| 2022/0144673 A1 * | 5/2022 | Xiang | C02F 1/46109 |
| 2022/0204401 A1 | 6/2022 | Sant et al. | |
| 2022/0212935 A1 | 7/2022 | Sant et al. | |
| 2022/0331740 A1 | 10/2022 | Simonetti et al. | |
| 2022/0380265 A1 | 12/2022 | Sant et al. | |
| 2023/0058065 A1 | 2/2023 | Sant et al. | |

(56) References Cited

U.S. PATENT DOCUMENTS

| | | | |
|---|---|---|---|
| 2023/0120088 | A1 | 4/2023 | Sant et al. |
| 2023/0201774 | A1* | 6/2023 | Deng ................... B01D 53/965 |
| | | | 204/534 |
| 2024/0018669 | A1 | 1/2024 | Simonetti et al. |

FOREIGN PATENT DOCUMENTS

| | | | |
|---|---|---|---|
| EP | 2438977 | B1 | 8/2014 |
| EP | 3177384 | A2 | 6/2017 |
| EP | 3515879 | A1 | 7/2019 |
| EP | 3656750 | A2 | 5/2020 |
| EP | 3744700 | A1 | 12/2020 |
| JP | H05-294693 | A | 11/1993 |
| JP | H05-330878 | A | 12/1993 |
| JP | 2002-145650 | A | 5/2002 |
| JP | 6970469 | B1 | 11/2021 |
| WO | WO-2000/060141 | A1 | 10/2000 |
| WO | WO-2008/018928 | A2 | 2/2008 |
| WO | WO-2009/078430 | A1 | 6/2009 |
| WO | WO-2010/006242 | A1 | 1/2010 |
| WO | WO-2014/005227 | A1 | 1/2014 |
| WO | WO-2014/009802 | A2 | 1/2014 |
| WO | WO-2015/112655 | A2 | 7/2015 |
| WO | WO-2015/154174 | A1 | 10/2015 |
| WO | WO-2016/022522 | A2 | 2/2016 |
| WO | WO-2016/061251 | A1 | 4/2016 |
| WO | WO-2018/011567 | A1 | 1/2018 |
| WO | WO-2018/058139 | A1 | 3/2018 |
| WO | WO-2018/081308 | A1 | 5/2018 |
| WO | WO-2018/081310 | A1 | 5/2018 |
| WO | WO-2019/006352 | A1 | 1/2019 |
| WO | WO-2019/036386 | A1 | 2/2019 |
| WO | WO-2019/036676 | A1 | 2/2019 |
| WO | WO-2022/221665 | A1 | 10/2022 |
| WO | WO-2023/069370 | A1 | 4/2023 |
| WO | WO-2024/020027 | A1 | 1/2024 |

OTHER PUBLICATIONS

Iizuka et al., Carbon dioxide recovery from carbonate solutions using bipolar membrane electrodialysis, Separation and Purification Technology, vol. 101, Nov. 2012, pp. 49-59 (Year: 2012).*
Stolaroff et al., Carbon Dioxide Capture from Atmospheric Air Using Sodium Hydroxide Spray, Environmental Science & Technology, vol. 42, No. 8, Mar. 2008, pp. 2728-2735 (Year: 2008).*
Technical Data Sheet fumasep © FBM, from Fumasep available online at https://www.bwt.com/en/-/media/bwt/fumatech/datasheets/new/fumasep/water-treatment-processes/fumasep-fbm-wet-formv22.pdf, accessed on Mar. 6, 2024 (Year: 2024).*
Chamber, Oxford English Dictionary, Available at https://www.oed.com/dictionary/chamber_n?tl=true&hide-all-quotations=true#9783349 [Accessed on Jun. 26, 2024] (Year: 2024).*
The Engineering ToolBox (2003). PFD—Process Flow Diagram. [online] Available at: https://www.engineeringtoolbox.com/pfd-process-flow-diagram-d_465.html [Accessed Jun. 26, 2024] (Year: 2003).*
Ahmad et al., "CO2 removal using membrane gas absorption with PVDF membrane incorporated with POSS and SAPO-34 zeolite", *Chemical Engineering Research and Design* 118: 238-247 (2017).
International Search Report and Written Opinion for International Application No. PCT/US2023/028023 dated Nov. 8, 2023.
Muroyama et al., "CO2 separation and transport via electrochemical methods", Journal of The Electrochemical Society 167.13: 133504 (2020).
Anantharaj et al., "Spinel cobalt titanium binary oxide as an all-non-precious water oxidation electrocatalyst in acid." Inorganic Chemistry 58.13 (2019): 8570-8576.
Balaji et al., "An alternative approach to selective sea water oxidation for hydrogen production." Electrochemistry Communications 11.8 (2009): 1700-1702.

Bennett, "Electrodes for generation of hydrogen and oxygen from seawater." International Journal of Hydrogen Energy 5.4 (1980): 401-408.
Bhardwaj et al., "Ultrathin silicon oxide overlayers enable selective oxygen evolution from acidic and unbuffered pH-neutral seawater." ACS Catalysis 11.3 (2021): 1316-1330.
Cheng et al., "Synergistic action of Co—Fe layered double hydroxide electrocatalyst and multiple ions of sea salt for efficient seawater oxidation at near-neutral pH." Electrochimica Acta 251 (2017): 336-343.
Choi et al., "A Reflection on Sustainable Anode Materials for Electrochemical Chloride Oxidation." Advanced Materials 35.43 (2023): 2300429.
De Lannoy et al., "Indirect ocean capture of atmospheric CO2: Part I. Prototype of a negative emissions technology." International journal of greenhouse gas control 70 (2018): 243-253.
El-Moneim et al., "Mn—Mo—Sn oxide anodes for oxygen evolution in seawater electrolysis for hydrogen production." ECS Transactions 25.40 (2010): 127.
El-Moneim et al., "Nanocrystalline manganese-molybdenum-tungsten oxide anodes for oxygen evolution in acidic seawater electrolysis." Materials transactions 46.2 (2005): 309-316.
El-Moneim, "Mn—Mo—W-oxide anodes for oxygen evolution during seawater electrolysis for hydrogen production: effect of repeated anodic deposition." international journal of hydrogen energy 36.21 (2011): 13398-13406.
Escudero-Escribano et al. "Importance of surface IrOx in stabilizing RuO2 for oxygen evolution." The Journal of Physical Chemistry B 122.2 (2018): 947-955.
Frydendal et al., "Toward an active and stable catalyst for oxygen evolution in acidic media: Ti-stabilized MnO2." Advanced Energy Materials 5.22 (2015): 1500991.
Fujimura et al., "Anodically deposited manganese-molybdenum oxide anodes with high selectivity for evolving oxygen in electrolysis of seawater." Journal of Applied Electrochemistry 29 (1999): 769-775.
Fujimura et al., "The durability of manganese-molybdenum oxide anodes for oxygen evolution in seawater electrolysis." Electrochimica acta 45.14 (2000): 2297-2303.
Gayen et al., "Selective seawater splitting using pyrochlore electrocatalyst." ACS Applied Energy Materials 3.4 (2020): 3978-3983.
Hashimoto et al., "New nanocrystalline manganese-molybdenum-tin oxide anodes for oxygen evolution in seawater electrolysis." ECS Transactions 1.4 (2006): 491-497.
Hine et al., "Electrochemical Behavior of the Oxide-Coated Metal Anodes." Journal of the Electrochemical Society 126.9 (1979): 1439.
Huynh et al., "A functionally stable manganese oxide oxygen evolution catalyst in acid." Journal of the American Chemical Society 136.16 (2014): 6002-6010.
Huynh et al., "Design of template-stabilized active and earth-abundant oxygen evolution catalysts in acid." Chemical science 8.7 (2017): 4779-4794.
Huynh et al., "Nature of activated manganese oxide for oxygen evolution." Journal of the American Chemical Society 137.47 (2015): 14887-14904.
Izumiya et al., "Anodically deposited manganese oxide and manganese-tungsten oxide electrodes for oxygen evolution from seawater." Electrochimica Acta 43.21-22 (1998): 3303-3312.
Izumiya et al., "Mn—W oxide anodes prepared by thermal decomposition for oxygen evolution in seawater electrolysis." Materials transactions, JIM 39.2 (1998): 308-313.
Izumiya et al., "Surface activation of manganese oxide electrode for oxygen evolution from seawater." Journal of applied electrochemistry 27 (1997): 1362-1368.
Kato et al., "Electrochemical characterization of degradation of oxygen evolution anode for seawater electrolysis." Electrochimica Acta 116 (2014): 152-157.
Kato et al., "Durability enhancement and degradation of oxygen evolution anodes in seawater electrolysis for hydrogen production." Applied surface science 257.19 (2011): 8230-8236.

(56) References Cited

OTHER PUBLICATIONS

Kwong et al., "Cobalt-doped hematite thin films for electrocatalytic water oxidation in highly acidic media." Chemical Communications 55.34 (2019): 5017-5020.
Kwong et al., "High-performance iron (III) oxide electrocatalyst for water oxidation in strongly acidic media." Journal of Catalysis 365 (2018): 29-35.
La Plante et al., "Electrolytic Seawater Mineralization and the Mass Balances That Demonstrate Carbon Dioxide Removal." ACS ES&T Engineering (2023).
Li et al., "Enhancing the stability of cobalt spinel oxide towards sustainable oxygen evolution in acid." Nature Catalysis 5.2 (2022): 109-118.
Li et al., "Oxygen evolution and corrosion behaviours of the porous Mn5Si3 electrode in sulfuric acid." Materials Research Express 6.8 (2019): 085542.
Li et al., "Stable potential windows for long-term electrocatalysis by manganese oxides under acidic conditions." Angewandte Chemie 131.15 (2019): 5108-5112.
Matsui et al., "Anodically deposited manganese-molybdenum-tungsten oxide anodes for oxygen evolution in seawater electrolysis." Journal of applied electrochemistry 32 (2002): 993-1000.
McCrory et al., "Benchmarking heterogeneous electrocatalysts for the oxygen evolution reaction." Journal of the American Chemical Society 135.45 (2013): 16977-16987.
Minke et al., "Is iridium demand a potential bottleneck in the realization of large-scale PEM water electrolysis?." international journal of hydrogen energy 46.46 (2021): 23581-23590.
Moreno-Hernandez, Ivan A., et al. "Crystalline nickel manganese antimonate as a stable water-oxidation catalyst in aqueous 1.0 MH 2 SO 4." Energy & Environmental Science 10.10 (2017): 2103-2108.
Okada et al., "A bilayer structure composed of Mg| Co—MnO2 deposited on a Co (OH) 2 film to realize selective oxygen evolution from chloride-containing water." Langmuir 36.19 (2020): 5227-5235.
Pan et al., "Efficient and stable noble-metal-free catalyst for acidic water oxidation." Nature communications 13.1 (2022): 2294.
Retuerto et al., "Highly active and stable OER electrocatalysts derived from Sr2MIrO6 for proton exchange membrane water electrolyzers." Nature Communications 13.1 (2022): 7935.
Seh et al., "Combining theory and experiment in electrocatalysis: Insights into materials design." Science 355.6321 (2017): eaad4998.
Seitz et al., "A highly active and stable IrOx/SrIrO3 catalyst for the oxygen evolution reaction." Science 353.6303 (2016): 1011-1014.
Tong et al., "Electrolysis of low-grade and saline surface water." Nature Energy 5.5 (2020): 367-377.
Vos et al., "MnOx/IrOx as selective oxygen evolution electrocatalyst in acidic chloride solution." Journal of the American Chemical Society 140.32 (2018): 10270-10281.
Wu et al., "Non-iridium-based electrocatalyst for durable acidic oxygen evolution reaction in proton exchange membrane water electrolysis." Nature Materials 22.1 (2023): 100-108.
Xu et al., "Calcination temperature dependent catalytic activity and stability of IrO2—Ta2O5 anodes for oxygen evolution reaction in aqueous sulfate electrolytes." Journal of The Electrochemical Society 164.9 (2017): F895-F900.
Xu et al., "Electrogeneration of hydrogen peroxide using Ti/IrO2—Ta2O5 anode in dual tubular membranes Electro-Fenton reactor for the degradation of tricyclazole without aeration." Chemical Engineering Journal 295 (2016): 152-159.
Yang et al., "Highly acid-durable carbon coated Co3O4 nanoarrays as efficient oxygen evolution electrocatalysts." Nano Energy 25 (2016): 42-50.
Yu et al., "Sustainable oxygen evolution electrocatalysis in aqueous 1 M H2SO4 with earth abundant nanostructured Co3O4." Nature communications 13.1 (2022): 4341.
Zhao et al., "Charge state manipulation of cobalt selenide catalyst for overall seawater electrolysis." Advanced Energy Materials 8.29 (2018): 1801926.
Zheng, "Binary platinum alloy electrodes for hydrogen and oxygen evolutions by seawater splitting." Applied Surface Science 413 (2017): 72-82.
Zheng, "Pt-free NiCo electrocatalysts for oxygen evolution by seawater splitting." Electrochimica Acta 247 (2017): 381-391.
Zhou et al., "Rutile alloys in the Mn—Sb—O system stabilize Mn3+ to enable oxygen evolution in strong acid." Acs Catalysis 8.12 (2018): 10938-10948.
Falzone et al., "New insights into the mechanisms of carbon dioxide mineralization by portlandite", AIChE Journal 67(5): e17160 (2021).
International Search Report and Written Opinion for International Application No. PCT/US2022/046917 dated Feb. 8, 2023.
Sanz-Pérez et al., "Direct Capture of CO2 from Ambient Air", Chem. Rev., 2016, vol. 116, pp. 11840-11876, 37 pages.
Kiani et al., "Techno-economic assessment for CO2 capture from air using a conventional liquid-based absorption process," Frontiers in Energy Research 8: 92 (2020).
Abbasi et al., "An investigation of the effect of RuO2 on the deactivation and corrosion mechanism of a Ti/IrO2+ Ta2O5 coating in an OER application", *journal of Electroanalytical Chemistry* 777: 67-74 (2016).
Adenier et al., "Electrochemical Oxidation of Aliphatic Amines and Their Attachment to Carbon and Metal Surfaces," Langmuir, 20: 8243-8253 (2004).
Arshad et al., "Equilibrium Solubility of CO2 in Alkanolamines," DTU Libraryy: 5 pages (2013).
Dutcher et al., "Amine-Based CO2 Capture Technology Development from the Beginning of 2013—A Review," Applied Materials & Interfaces, 7: 2137-2148 (2015).
Eisaman et al., "CO2 separation using bipolar membrane electrodialysis," Energy & Environmental Science, 4: 1319-1328 (2011).
Erans et al., "Direct air capture: process technology, technoeconomic and socio-political challenges," Energy & Environmental Science, 15: 1360-1405 (2022).
Fujimura et al., "Oxygen evolution on manganese-molybdenum oxide anodes in seawater electrolysis", *Materials Science and Engineering: A* 267.2: 254-259 (1999).
Hashimoto et al., "Advanced materials for global carbon dioxide recycling", *Materials Science and Engineering: A* 304: 88-96 (2001).
Husebye et al., "Techno economic evaluation of amine based CO2 capture: impact of CO2 concentration and steam supply," Energy Procedia, 23: 381-390 (2012).
International Search Report and Written Opinion for Application No. PCT/US2022/025028 dated Jul. 13, 2022.
Ivy., "Summary of Electrolytic Hydrogen Production Milestone Completion Report," National Renewable Energy Laboratory: 27 pages (2004).
Keith et al., "A Process for Capturing CO2 from the Atmosphere," Joule, 2: 1573-1594 (2018).
Keith et al., "Climate Strategy with CO2 Capture From the Air," Climatic Changes: 29 pages (2005).
La Plante et al. "Electrolytic seawater mineralization and how it ensures (net) carbon dioxide removal", Submitted to ACS ES&T Engineering, Jan. 2023, 23 pages.
Liu et al., "Electrochemically mediated carbon dioxide separation with quinone chemistry in salt-concentrated aqueous media," Nature Communications, 11: Article No. 2278 pp. 1-11 (2020).
Lv et al., "Mechanisms of CO2 Capture into Monoethanolamine Solution with Different CO2 Loading during the Absorption/Desorption Processes," Enviromental Science & Technology, 49: 10728-10735 (2015).
MacDowell et al., "An overview of CO2 capture technologies," Energy & Environmental Science, 3: 1645-1669 (2010).
Marshall et al., "A review of adhesion science", *Dental materials* 26.2: e11-e16 (2010).
Mccann et al., "Simulation of Ethalpy and Capacity of CO2 Absorption by Aqueous Amine Systems", Ind. Eng. Chem. Res., 47: pp. 2002-2009 (2008).
Mezza et al., "An Electrochemical Platform for the Carbon Dioxide Capture and Conversion to Syngas," Energies, 14: 7869 pp. 1-13 (2021).

(56) References Cited

OTHER PUBLICATIONS

Pal et al., "Adsorptive removal of heat stable salt anions from industrial lean amine solvent using anion exchange resins from gas sweetening unit," Journal of Natural Gas Science and Engineering 15(2013): pp. 14-21 (2013).
Rahimi et al., "Bench-scale demonstration of CO2 capture with an electrochemically driven proton concentration process," RSC Advances, 10: 16832 (2020).
Rau et al., "Direct electrolytic dissolution of silicate minerals for air CO2 mitigation and carbon-negative H2 production," PNAS, 110(25): 10095-10100 (2013).
Rinberg et al., "Alkalinity Concentration Swing for Direct Air Capture of Carbon Dioxide," ChemSusChem, 14: 1-16 (2021).
Roussanaly et al., "Techno-economic analysis of MEA CO2 capture from a cement kiln—impact of steam supply scenario," Energy Procedia, 114: 6229-6239 (2017).
Sabatino et al., "Evaluation of a Direct Air Capture Process Combining Wet Scrubbing and Bipolar Membrane Electrodialysis," Industrial & Engineering Chemistry Research, 59: 7007-7020 (2020).
Sakwattanapong et al., "Behavior of Reboiler Heat Duty for CO2 Capture Plants Using Regenerable Single and Blended Alkanolamines," Ind. Eng. Chem. Res., 44: 4465-4473 (2005).
Shu et al., "Electrochemical Regeneration of Spent Alkaline Absorbent from Direct Air Capture," Environmental Science & Technology, 54: 8890-8998 (2020).
Stern et al., "Bench-scale demonstration of CO2 capture with electrochemically-mediated amine regeneration," RSC Advances, 4: 5906-5914 (2014).
Stern et al., "Post-combustion carbon dioxide capture using electrochemically mediated amine regeneration," Energy & Environmental Science, 6: 2505-2517 (2013).
Stripe Carbon Removal Purchase Application submitted Mar. 31, 2022.
Tang et al., "Advances in the application of manganese dioxide and its composites as electrocatalysts for the oxygen evolution reaction", *Journal of Materials Chemistry A* 8(36): 18492-18514 (2020).
Voskian et al., "Faradaic electro-swing reactive adsorption for CO2 capture," Energy & Environmental Science, 12: 3530-3547 (2019).
Wang et al. "Technoeconomic Analysis of the Electrochemically Mediated Amine Regeneration CO2 Capture Process" Ind. Eng. Chem. Res., 59: 14085-14095 (Year: 2020).
Wang et al., "CO2 Capture Using Electrochemically Mediated Amine Regeneration," Massachusetts Institute of Technology: 27 pages (2020).
Wang et al., "Energetics of electrochemically mediated amine regeneration process for flue gas CO2 capture," International Journal of Greenhouse Gas Control, 82: 48-58 (2019).
Wang et al., "Flue gas CO2 capture via electrochemically mediated amine regeneration: System design and performance," Applied Energy, 255: 113879 (2019).
Buck., "Alkali Reactivity of Strained Quartz as a Constituent of Concrete Aggregate," Aug. 1983, 17 pages.
Communication Pursuant to Rules 70(2) and 70a(2) EPC on EP 18845904.4 dated Apr. 28, 2021.
Examination Report on IN 201927016758 dated Dec. 14, 2020 (5 pages).
Extended European Search Report for EP Application No. 17865241.8 dated May 15, 2020.
Extended European Search Report for EP Application No. 18845904.4 dated Apr. 7, 2021.
Final Office Action for U.S. Appl. No. 18/171,164 dated Sep. 29, 2023.
Final Office Action for U.S. Appl. No. 15/519,524 dated Nov. 21, 2019.
Final Office Action for U.S. Appl. No. 15/519,524 dated Oct. 14, 2020.
Glushkov et al., "Composition of gas produced from the direct combustion and pyrolysis of biomass", Process Safety and Environmental Protection, V. 156, 2021, pp. 43-56.
International Preliminary Report on Patentability for International Application No. PCT/US2017/058359 dated May 9, 2019.
International Preliminary Report on Patentability for International Application No. PCT/US2018/040373 dated Jan. 9, 2020.
International Preliminary Report on Patentability for International Application No. PCT/US2018/046557 dated Feb. 27, 2020.
International Search Report and Written Opinion for International Application No. PCT/US2015/055564 dated Jan. 22, 2016.
International Search Report and Written Opinion for International Application No. PCT/US2017/058359 dated Jan. 9, 2019.
International Search Report and Written Opinion for International Application No. PCT/US2018/040373 dated Sep. 20, 2018.
International Search Report and Written Opinion for International Application No. PCT/US2018/046557 dated Dec. 17, 2018.
International Search Report and Written Opinion for International Application No. PCT/US2023/013350 dated Jun. 15, 2023.
International Search Report and Written Opinion for International Application No. PCT/US2023/018395 dated Sep. 15, 2023.
International Search Report and Written Opinion for International Application No. PCT/US2023/024217 dated Oct. 9, 2023.
International Search Report and Written Opinion for International Application No. PCT/US2024/013806 dated May 30, 2024.
La Plante et al., "Controls on CO2 Mineralization Using Natural and Industrial Alkaline Solids under Ambient Conditions", ACS Sustainable Chem. Eng., 9(32), pp. 10727-10739, 2021.
Li et al., "pH control using polymer-supported phosponic acids as reusable buffer agents," Green Chem., 2015, vol. 17, pp. 3771-3774.
Mehdipour et al., "How Microstructure and Pore Moisture Affect Strength Gain in Portlandite-Enriched Composites That Mineralize CO2", ACS Sustainable Chem. Eng., 7(15), pp. 13053-13061, 2019.
Mehdipour et al., "The role of gas flow distributions on CO2 mineralization within monolithic cemented composites: coupled CFD-factorial design approach", Reaction Chemistry & Engineering 6 (3), pp. 494-504, 2021.
Murnandari et al., "Effect of process parameters on the CaCO3 production in the single process for carbon capture and mineralization", Korean Journal of Chemical Engineering, Mar. 2017, vol. 34, Issue 3, pp. 935-941.
Non-Final Office Action for U.S. Appl. No. 18/171,164 dated Jun. 6, 2023.
Non-Final Office Action for U.S. Appl. No. 15/519,524 dated May 16, 2019.
Non-Final Office Action on U.S. Appl. No. 15/519,524 dated Apr. 29, 2020, 12 pages.
Notice of Allowance for U.S. Appl. No. 15/519,524 dated Feb. 2, 2021.
Office Action for CN Application No. 201780076640.2 dated May 7, 2021.
Ramasubramanian et al., "Membrane processes for carbon capture from coal-fired power plant flue gas: A modeling and cost study," Journal of Membrane Science (2012) 421-422: 299-310.
Reddy et al., "Simultaneous capture and mineralization of coal combustion flue gas carbon dioxide (CO2)," Energy Procedia, 4, (2011), pp. 1574-1583.
Vega-Vila et al. "Metal cations as inorganic structure-directing agents during the synthesis of phillipsite and tobermorite", Reaction Chemistry and Engineering, Mar. 1, 2023, 8, pp. 1176-1184.
Wang et al., "Integration of CO2 capture and storage based on pH-swing mineral carbonation using recyclable ammonium salts," Energy Procedia 4, 2011, 4930-4936.
Wei et al., "Clinkering-Free Cementation by Fly Ash Carbonation", Journal of CO2 Utilization, 23, pp. 117-127, 2018.

\* cited by examiner

MULTI-CHAMBERED ELECTROCHEMICAL CELL FOR CARBON DIOXIDE REMOVAL

CROSS REFERENCE TO RELATED APPLICATIONS

This application claims the benefit of priority to U.S. Provisional Application 63/390,123, filed Jul. 18, 2022, the entire contents of which are incorporated by reference herein.

FIELD OF THE DISCLOSED SUBJECT MATTER

The disclosed subject matter relates to a system and method for a multi-chambered electrochemical cell for carbon dioxide removal. Particularly, the present disclosed subject matter is directed to a system and method for a multi-chambered electrochemical cell configured for continuous carbon dioxide removal.

BACKGROUND

Due to historical global emissions of $CO_2$, many leading scientific experts project that 10-20 Gt $CO_2$ need to be removed per year by mid-century to avoid the worst impacts of global temperature increase and severe weather events. As a result, resource- and cost-effective carbon dioxide removal (CDR) strategies must be developed to achieve global adoption. Current direct air capture (DAC) technologies, an emerging engineered CDR solution, rely on thermal energy to achieve a thermal swing, thereby releasing the absorbed or adsorbed $CO_2$ from the solvent or sorbent, respectively. These processes require massive, centralized infrastructure and either rely on geothermal or waste heat, resulting in extreme project siting constraints, or the additional burning of fossil fuels, grossly limiting the net removal potential, to achieve the temperature swing. Thus there remains a need for a system and method for efficient carbon dioxide removal.

SUMMARY OF THE DISCLOSED SUBJECT MATTER

Described herein is an alternative approach to achieve solvent desorption and regeneration for direct air capture by using a novel multi-chambered electrochemical cell. This development eliminates the geographic constraints and offers freedom in siting, while relying solely on water and electricity as continuous inputs. The invention disclosed herein improves upon prior electrochemical cells by eliminating the need for an external anion exchange resin column through the introduction of a base swing chamber, which can significantly reduce the system size and complexity and offers improved energy efficiencies.

To achieve these and other advantages and in accordance with the purpose of the disclosed subject matter, as embodied and broadly described, the disclosed subject matter includes a system for a multi-chambered electrochemical cell for carbon dioxide removal including an electrochemical cell.

In certain embodiments, the electrochemical cell further includes an anodic chamber disposed at a first end of the electrochemical cell, the anodic chamber including an anode. In some embodiments, the electrochemical cell includes an acid swing chamber disposed adjacent to the anodic chamber and separated therefrom by a first cation exchange membrane. In certain embodiments, the electrochemical cell includes a desalination chamber, the desalination chamber separated from the acid swing chamber by a first anion exchange membrane. In some embodiments, the electrochemical cell further includes a base swing chamber in fluid communication with the acid swing chamber and, when present, the desalination chamber, and the base swing chamber is disposed adjacent to the desalination chamber and separated therefrom by a second cation exchange membrane. In certain embodiments, the electrochemical cell includes a cathodic chamber disposed at a second end of the electrochemical cell, the cathodic chamber including a cathode. In some embodiments, the cathodic chamber is disposed adjacent to the base swing chamber and separated therefrom by a second anion exchange membrane.

In some embodiments, the anodic chamber is configured to generate protons and the protons are configured to travel through the first cation exchange membrane.

In some embodiments, the cathodic chamber is configured to generate hydroxides.

In some embodiments, the first anion exchange membrane is configured to be permeable to hydroxides.

In some embodiments, the system comprises at least one pump.

In some embodiments, the desalination chamber comprises a salt.

In some preferred embodiments, the salt is $NaCl$, $NaNO_3$, $KCl$ or $KNO_3$. In certain such embodiments, the salt is $NaCl$. In other such embodiments, the salt is $NaNO_3$. In yet other such embodiments, the salt is $KCl$. In still other such embodiments, the salt is $KNO_3$.

In some embodiments, the system comprises a plurality of distinct electrochemical cells, the plurality of distinct electrochemical cells configured to be in fluid communication and electrically connected.

The disclosed subject matter also includes a system for a multi-chambered electrochemical cell for carbon dioxide removal, the system includes an electrochemical cell. The electrochemical cell includes an anodic chamber disposed at a first end of the electrochemical cell, the anodic chamber includes an anode. The electrochemical cell includes an acid swing chamber disposed adjacent to the anodic chamber and separated therefrom by a cation exchange membrane. The electrochemical cell including a base swing chamber in fluid communication with the acid swing chamber, wherein the base swing chamber is disposed adjacent to the acid swing chamber and separated therefrom by a membrane and wherein the membrane is non-ionic. The electrochemical cell includes a cathodic chamber disposed at a second end of the electrochemical cell, the cathodic chamber includes a cathode, wherein the cathodic chamber is disposed adjacent to the base swing chamber and separated therefrom by an anion exchange membrane.

In some embodiments, the membrane comprises polyvinylidene fluoride.

In some embodiments, the system comprises at least one pump.

In some embodiments, the base swing chamber and the cathodic chamber are disposed within a common base swing/cathodic chamber.

In some embodiments, the system comprises a plurality of distinct electrochemical cells, the plurality of distinct electrochemical cells configured to be in fluid communication and electrically connected.

In some embodiments, each of the plurality of distinct electrochemical cells are each separated by a bipolar membrane, the bipolar membrane configured to dissociate water into protons and a plurality of hydroxides.

In certain aspects, provided herein are systems for carbon dioxide removal, the system comprising:
- a first electrochemical cell, the first electrochemical cell comprising:
  - a first acid swing chamber disposed at a first end of the first electrochemical cell;
  - a first desalination chamber, the first desalination chamber separated from the first acid swing chamber by a first anion exchange membrane; and
  - a first base swing chamber disposed at a second end of the first electrochemical cell and in fluid communication with the first acid swing chamber and the first desalination chamber, wherein
    - the first base swing chamber is disposed adjacent to the first desalination chamber and separated therefrom by a first cation exchange membrane;
  - a first anodic chamber, comprising an anode, disposed adjacent to the first end of the first electrochemical cell, separated therefrom by a first bipolar exchange membrane; and
  - a first cathodic chamber, comprising a cathode, adjacent to the second end of the first electrochemical cell, separated therefrom by a second bipolar exchange membrane;
- wherein the first electrochemical cell, the first anodic chamber, and the first cathodic chamber are in fluid and electrical communication.

In some aspects, provided herein are systems for carbon dioxide removal, the system comprising:
- a first electrochemical cell, the first electrochemical cell comprising:
  - a first acid swing chamber disposed at a first end of the first electrochemical cell;
  - a first desalination chamber, the first desalination chamber separated from the first acid swing chamber by a first anion exchange membrane; and
  - a first base swing chamber disposed at a second end of the first electrochemical cell and in fluid communication with the first acid swing chamber and the first desalination chamber, wherein
    - the first base swing chamber is disposed adjacent to the first desalination chamber and separated therefrom by a first cation exchange membrane;
  - a first anodic chamber, comprising an anode, disposed adjacent to the first end of the first electrochemical cell, separated therefrom by a first bipolar exchange membrane; and
  - a first cathodic chamber, comprising a cathode, adjacent to the second end of the first electrochemical cell, separated therefrom by a second bipolar exchange membrane;
- wherein the first electrochemical cell, the first anodic chamber, and the first cathodic chamber are in fluid and electrical communication.

In certain aspects, provided herein are systems for carbon dioxide removal comprising:
- a first electrochemical cell comprising:
  - a first acid swing chamber disposed at a first end of the first electrochemical cell;
  - a first base swing chamber disposed at a second end of the first electrochemical cell and in fluid communication with the first acid swing chamber
  - a first anodic chamber, comprising an anode, disposed adjacent to the first end of the first electrochemical cell, separated therefrom by a first bipolar exchange membrane; and
  - a first cathodic chamber, comprising a cathode, adjacent to the second end of the first electrochemical cell, separated therefrom by a second bipolar exchange membrane;
- wherein the first electrochemical cell, the first anodic chamber, and the first cathodic chamber are in fluid and electrical communication.

In some embodiments, systems of the disclosure further comprise:
- a first molten salt chamber in fluid communication with the first acid swing chamber;
- a second molten salt chamber in fluid communication with the first acid swing chamber and the first base swing chamber; and
- a third molten salt chamber in fluid communication with the first base swing chamber,
- wherein:
- the first molten salt chamber is configured to provide a first molten salt solution comprising a molten salt and $CO_2$ to the first acid swing chamber;
- the second molten salt chamber is configured to transfer a second molten salt solution comprising the molten salt, $CO_2$, and protons from the first acid swing chamber to the first base swing chamber; and
- the third molten salt chamber is configured to remove a third molten salt solution comprising the molten salt from the base swing chamber.

In some aspects, provided herein are methods for a multi-chambered electrochemical cell for carbon dioxide removal, the methods comprising:
- providing water to an anodic chamber and a cathodic chamber, the anodic and the cathodic chambers configured to dissociate the water into protons and hydroxides, respectively;
- providing a carbon dioxide-loaded amine to an acid swing chamber, the acid swing chamber in ionic communication with the anodic chamber;
- providing the protons and counterions to the acid swing chamber, thereby acidifying the carbon dioxide-loaded amine and desorbing the carbon dioxide therefrom, producing an acidified amine;
- capturing the desorbed carbon dioxide;
- providing the acidified amine to a base swing chamber, the base swing chamber in ionic communication with the cathodic chamber; and
- providing the hydroxides and counterions to the base swing chamber, thereby alkalinizing the amine to produce an alkalinized amine.

To achieve these and other advantages and in accordance with the purpose of the disclosed subject matter, as embodied and broadly described, the disclosed subject matter includes a method for utilizing a multi-chambered electrochemical cell for carbon dioxide removal. The method includes providing water to an anodic chamber and cathodic chamber, the anodic and cathodic chambers configured to dissociate the water into protons and hydroxides, respectively. The method includes providing a carbon dioxide-loaded amine to an acid swing chamber, the acid swing chamber in ionic communication with the anodic chamber and a desalination chamber, the desalination chamber configured to provide a plurality of counterions. The method includes providing the protons and the counterions to the acid swing chamber, thereby acidifying the carbon dioxide-loaded amine and desorbing the carbon dioxide therefrom. The method includes capturing the desorbed carbon dioxide and providing the acidified amine to a base swing chamber, the base swing chamber in ionic communication with the cathodic chamber and the desalination chamber. The method further includes providing the hydroxides and counterions to the base swing chamber, thereby alkalinizing the amine, providing the alkalinized amine to the desalination chamber and evacuating the amine from the desalination chamber.

In some embodiments, the water is provided to the anodic and cathodic chambers continuously.

In some embodiments, providing the carbon dioxide-loaded amine comprises providing the carbon dioxide-loaded amine at about 0.6-0.8 milliliters per minute per Ampere.

In some embodiments, the method further comprises controlling a pH level in each of the acid swing chamber and the base swing chamber via feedback control.

In some embodiments, the carbon dioxide-loaded amine is carbon dioxide-loaded piperazine.

In some embodiments, the carbon dioxide-loaded amine is present at a molarity from 0.1 M to 10.0 M.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

DETAILED DESCRIPTION OF EXEMPLARY EMBODIMENTS

Figure 1:
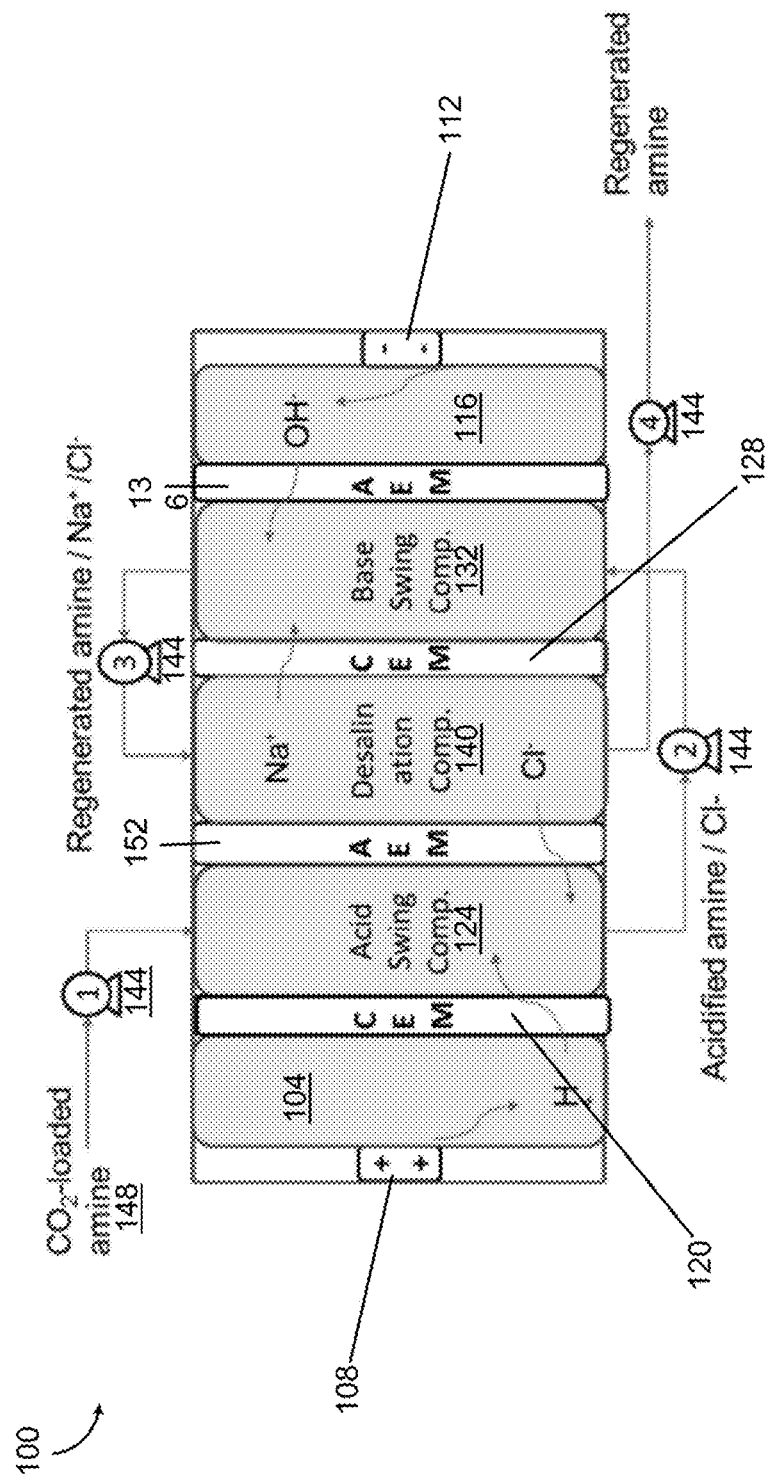
FIG. 1 is a schematic representation of an electrochemical flow cell for carbon dioxide removal in accordance with the disclosed subject matter.

The methods and systems presented herein may be used for removing carbon from a fluid. The disclosed subject matter is particularly suited for utilizing an electrochemical cell to remove carbon dioxide from a fluid continuously.

Systems for Removal of $CO_2$

In certain aspects, provided herein are systems for a multi-chambered electrochemical cell for carbon dioxide removal, the system comprising:
an electrochemical cell, the electrochemical cell further comprising:
an anodic chamber disposed at a first end of the electrochemical cell, the anodic chamber comprising an anode;
an acid swing chamber disposed adjacent to the anodic chamber and separated therefrom by a first cation exchange membrane;
a desalination chamber, the desalination chamber separated from the acid swing chamber by a first anion exchange membrane;
a base swing chamber in fluid communication with the acid swing chamber and the desalination chamber, wherein
the base swing chamber is disposed adjacent to the desalination chamber and separated therefrom by a second cation exchange membrane; and
a cathodic chamber disposed at a second end of the electrochemical cell, the cathodic chamber comprising a cathode, wherein the cathodic chamber is disposed adjacent to the base swing chamber and separated therefrom by a second anion exchange membrane.

In some aspects, provided herein are systems for carbon dioxide removal, the system comprising:
a first electrochemical cell, the first electrochemical cell further comprising:
a first anodic chamber disposed at a first end of the first electrochemical cell, the first anodic chamber comprising an anode;
a first acid swing chamber disposed adjacent to the first anodic chamber and separated therefrom by a first cation exchange membrane;
a desalination chamber, the desalination chamber separated from the first acid swing chamber by a first anion exchange membrane;
a first base swing chamber in fluid communication with the first acid swing chamber and the desalination chamber, wherein
the first base swing chamber is disposed adjacent to the desalination chamber and separated therefrom by a second cation exchange membrane; and
a first cathodic chamber disposed at a second end of the first electrochemical cell, the first cathodic chamber comprising a cathode, wherein
the first cathodic chamber is disposed adjacent to the first base swing chamber and separated therefrom by a second anion exchange membrane.

In certain aspects, provided herein are systems for a multi-chambered electrochemical cell for carbon dioxide removal, the system comprising:
an electrochemical cell, the electrochemical cell further comprising:
an anodic chamber disposed at a first end of the electrochemical cell, the anodic chamber comprising an anode;
an acid swing chamber disposed adjacent to the anodic chamber and separated therefrom by a cation exchange membrane;
a base swing chamber in fluid communication with the acid swing chamber, wherein;
the base swing chamber is disposed adjacent to the acid swing chamber and separated therefrom by a membrane, wherein the membrane is non-ionic; and
a cathodic chamber disposed at a second end of the electrochemical cell, the cathodic chamber comprising a cathode, wherein
the cathodic chamber is disposed adjacent to the base swing chamber and separated therefrom by an anion exchange membrane.

In certain aspects, provided herein are systems for carbon dioxide removal, the system comprising:
a first electrochemical cell, the first electrochemical cell comprising:
a first acid swing chamber disposed at a first end of the first electrochemical cell;
a first desalination chamber, the first desalination chamber separated from the first acid swing chamber by a first anion exchange membrane; and
a first base swing chamber disposed at a second end of the first electrochemical cell and in fluid communication with the first acid swing chamber and the first desalination chamber, wherein
the first base swing chamber is disposed adjacent to the first desalination chamber and separated therefrom by a first cation exchange membrane;
a first anodic chamber, comprising an anode, disposed adjacent to the first end of the first electrochemical cell, separated therefrom by a first bipolar exchange membrane; and
a first cathodic chamber, comprising a cathode, adjacent to the second end of the first electrochemical cell, separated therefrom by a second bipolar exchange membrane;
wherein the first electrochemical cell, the first anodic chamber, and the first cathodic chamber are in fluid and electrical communication.

In some aspects, provided herein are systems for carbon dioxide removal, the system comprising:
a first electrochemical cell, the first electrochemical cell comprising:
a first acid swing chamber disposed at a first end of the first electrochemical cell;
a first desalination chamber, the first desalination chamber separated from the first acid swing chamber by a first anion exchange membrane; and
a first base swing chamber disposed at a second end of the first electrochemical cell and in fluid communication with the first acid swing chamber and the first desalination chamber, wherein
the first base swing chamber is disposed adjacent to the first desalination chamber and separated therefrom by a first cation exchange membrane;
a first anodic chamber, comprising an anode, disposed adjacent to the first end of the first electrochemical cell, separated therefrom by a first bipolar exchange membrane; and
a first cathodic chamber, comprising a cathode, adjacent to the second end of the first electrochemical cell, separated therefrom by a second bipolar exchange membrane;
wherein the first electrochemical cell, the first anodic chamber, and the first cathodic chamber are in fluid and electrical communication.

In certain aspects, provided herein are systems for carbon dioxide removal comprising:
a first electrochemical cell comprising:
a first acid swing chamber disposed at a first end of the first electrochemical cell;
a first base swing chamber disposed at a second end of the first electrochemical cell and in fluid communication with the first acid swing chamber
a first anodic chamber, comprising an anode, disposed adjacent to the first end of the first electrochemical cell, separated therefrom by a first bipolar exchange membrane; and
a first cathodic chamber, comprising a cathode, adjacent to the second end of the first electrochemical cell, separated therefrom by a second bipolar exchange membrane;
wherein the first electrochemical cell, the first anodic chamber, and the first cathodic chamber are in fluid and electrical communication.

In some embodiments, systems of the disclosure further comprise:
a first molten salt chamber in fluid communication with the first acid swing chamber;
a second molten salt chamber in fluid communication with the first acid swing chamber and the first base swing chamber; and
a third molten salt chamber in fluid communication with the first base swing chamber.

wherein:
the first molten salt chamber is configured to provide a first molten salt solution comprising a molten salt and $CO_2$ to the first acid swing chamber;
the second molten salt chamber is configured to transfer a second molten salt solution comprising the molten salt, $CO_2$, and protons from the first acid swing chamber to the first base swing chamber; and
the third molten salt chamber is configured to remove a third molten salt solution comprising the molten salt from the base swing chamber.

In some preferred embodiments, the system comprises a plurality of distinct electrochemical cells configured to be in fluid communication and electrically connected. In certain such embodiments, each of the plurality of distinct electrochemical cells are separated by a dividing bipolar membrane. In further preferred embodiments, the dividing bipolar membrane is configured to dissociate water into protons and hydroxides.

In certain embodiments, each of the plurality of distinct electrochemical cells is configured such that:
the first cathodic chamber disposed at the second end of the first electrochemical cell is disposed adjacent to a first face of the dividing bipolar membrane;
a second anodic chamber, disposed at a first end of a second electrochemical cell, is disposed adjacent to a second face of the dividing bipolar membrane; and
the first cathodic chamber of the first electrochemical cell is in fluid communication with the second anodic chamber of the second electrochemical cell.

In some embodiments, each of the plurality of distinct electrochemical cells is configured such that:
the first cathodic chamber disposed at the second end of the first electrochemical cell is disposed adjacent to a second cathodic chamber disposed at a second end of a second electrochemical cell, such that the first electrochemical cell and the second electrochemical cell share a cathode.

In certain embodiments, each of the plurality of distinct electrochemical cells is configured such that:
the first base swing chamber, disposed at a second end of the first electrochemical cell, is disposed adjacent to a first face of the dividing bipolar membrane;
a second acid swing chamber, disposed at a first end of a second electrochemical cell, is disposed adjacent to a second face of the dividing bipolar membrane; and
the first base swing chamber of the first electrochemical cell is in fluid communication with the second acid swing chamber of the second electrochemical cell.

In certain embodiments, the anode is disposed at a first end of the plurality of distinct electrochemical cells, and the cathode is disposed at a second end of the plurality of distinct electrochemical cells; and the cathode, the anode, and the plurality of distinct electrochemical cells form a closed circuit.

In some embodiments, each of the plurality of distinct electrochemical cells is configured such that:
the first base swing chamber, disposed at the second end of the first electrochemical cell, is disposed adjacent to a first face of the dividing bipolar membrane;
a second acid swing chamber, disposed at a first end of a second electrochemical cell, is disposed adjacent to a second face of the dividing bipolar membrane; and
the first base swing chamber of the first electrochemical cell is in fluid communication with the second acid swing chamber of the second electrochemical cell.

In some embodiments, the anode is disposed at a first end of the plurality of distinct electrochemical cells, and the cathode is disposed at a second end of the plurality of distinct electrochemical cells, and the cathode, the anode, and the plurality of distinct electrochemical cells form a closed circuit.

In certain embodiments, the plurality of distinct cells may comprise from 2 distinct electrochemical cells to about 300 distinct electrochemical cells. In some embodiments, the plurality of distinct electrochemical cells comprises from about 2 to about 500 distinct electrochemical cells. In certain preferred embodiments, the plurality of distinct electrochemical cells comprises from about 100 to about 200 distinct electrochemical cells. In some such preferred embodiments, the plurality of distinct electrochemical cells comprises about 100 distinct electrochemical cells. In other such preferred embodiments, the plurality of distinct electrochemical cells comprises about 150 distinct electrochemical cells. In yet other such preferred embodiments, the plurality of distinct electrochemical cells comprises about 200 distinct electrochemical cells.

In certain embodiments, the desalination chamber comprises a salt. In some such preferred embodiments, the salt is NaCl, $NaNO_3$, KCl or $KNO_3$. In certain preferred embodiments, the salt is NaCl. In some preferred embodiments, the salt is $NaNO_3$. In certain preferred embodiments, the salt is KCl. In some preferred embodiments, the salt is $KNO_3$.

In some embodiments, the system further comprises:
a first molten salt chamber in fluid communication with the first acid swing chamber;
a second molten salt chamber in fluid communication with the first acid swing chamber and the first base swing chamber; and
a third molten salt chamber in fluid communication with the first base swing chamber,
wherein:
the first molten salt chamber is configured to provide a first molten salt solution comprising a molten salt and $CO_2$ to the first acid swing chamber;
the second molten salt chamber is configured to transfer a second molten salt solution comprising the molten salt, $CO_2$, and protons from the first acid swing chamber to the first base swing chamber; and
the third molten salt chamber is configured to remove a third molten salt solution comprising the molten salt from the base swing chamber.

In some such embodiments, the system further comprises a desalination chamber in fluid communication with the first acid swing chamber, the first base swing chamber, and the third molten salt chamber, wherein the third molten salt chamber is configured to remove the third molten salt solution from the base swing chamber and provide the third molten salt solution to the desalination chamber. In certain preferred embodiments, the first molten salt solution, the second molten salt solution, and the third molten salt solution each comprise a salt of at least one alkali element. In some such embodiments, the salt of at least one alkali element is selected from LiOH, NaOH, KOH, $Li_2O$, $Na_2O$, $K_2O$, and combinations thereof. In certain preferred embodiments, the salt of at least one alkali element is NaOH.

Methods of $CO_2$ Removal

In some aspects, provided herein are methods for a multi-chambered electrochemical cell for carbon dioxide removal, the methods comprising:

providing water to an anodic chamber and a cathodic chamber, the anodic and the cathodic chambers configured to dissociate the water into protons and hydroxides, respectively;

providing a carbon dioxide-loaded amine to an acid swing chamber, the acid swing chamber in ionic communication with the anodic chamber;

providing the protons and counterions to the acid swing chamber, thereby acidifying the carbon dioxide-loaded amine and desorbing the carbon dioxide therefrom, producing an acidified amine;

capturing the desorbed carbon dioxide;

providing the acidified amine to a base swing chamber, the base swing chamber in ionic communication with the cathodic chamber; and providing the hydroxides and counterions to the base swing chamber, thereby alkalinizing the amine to produce an alkalinized amine.

In certain embodiments, the water is provided to the anodic and cathodic chambers continuously.

In some embodiments, providing the carbon dioxide-loaded amine comprises providing the carbon dioxide-loaded amine at about 0.6-0.8 milliliters per minute per Ampere. In certain such embodiments, the method comprises providing the carbon dioxide-loaded amine at about milliliters per minute per Ampere. In other embodiments, the method comprises providing the carbon dioxide-loaded amine at about 0.7 milliliters per minute per Ampere. In yet other embodiments, the method comprises providing the carbon dioxide-loaded amine at about 0.8 milliliters per minute per Ampere.

In certain embodiments, the method further comprises controlling a pH level in each of the acid swing chamber and the base swing chamber via feedback control.

In some preferred embodiments, the carbon dioxide-loaded amine is carbon dioxide-loaded piperazine.

In certain embodiments, the carbon dioxide-loaded amine is present at a molarity from 0.1 M to 10.0 M. In certain embodiments, the carbon dioxide-loaded amine is present at a molarity of about 0.1 M, about 1 M, about 2 M, about 3 M, about 4 M, about 5 M, about 6 M, about 7 M, about 8 M, about 9 M, or about 10 M.

In some embodiments, the method further comprises providing the water and the carbon dioxide-loaded amine to at least one electrochemical cell, wherein the at least one electrochemical cell comprises the anodic chamber, the acid swing chamber, the base swing chamber, the cathodic chamber. In certain preferred embodiments, the at least one electrochemical cell is a plurality of distinct electrochemical cells configured to be in fluid and electrical communication. In some such embodiments, which are preferred, each of the plurality of distinct electrochemical cells is separated by a dividing bipolar membrane.

In certain embodiments, providing the protons and counterions to the acid swing chamber results in an average pH in the acid swing chamber of between about 8.5 and about 5.5. In certain such embodiments, providing the protons and counterions to the acid swing chamber results in an average pH in the acid swing chamber of about 8.5. In other embodiments, providing the protons and counterions to the acid swing chamber results in an average pH in the acid swing chamber of about 8. In yet other embodiments, providing the protons and counterions to the acid swing chamber results in an average pH in the acid swing chamber of about 7.5. In still other embodiments, providing the protons and counterions to the acid swing chamber results in an average pH in the acid swing chamber of about 7.0. In other embodiments, providing the protons and counterions to the acid swing chamber results in an average pH in the acid swing chamber of about 6.5. In yet other embodiments, providing the protons and counterions to the acid swing chamber results in an average pH in the acid swing chamber of about 6.0. In still other embodiments, providing the protons and counterions to the acid swing chamber results in an average pH in the acid swing chamber of about 5.5.

In certain embodiments, providing the protons and counterions to the acid swing chamber comprises changing a pH in the acid swing chamber from about 8.5 to about 5.5. In some embodiments, providing the protons and counterions to the acid swing chamber comprises changing a pH in the acid swing chamber from about 8.0 to about 6.0.

In some embodiments, providing the protons and counterions to the acid swing chamber results in a change in conductivity therein of from about 45 ms/cm to about 100 ms/cm. In some embodiments, providing the protons and counterions to the acid swing chamber results in a change in conductivity therein of from about 50 ms/cm to about 100 ms/cm. In certain embodiments, providing the protons and counterions to the acid swing chamber results in a change in conductivity therein of from about 50 ms/cm to about 90 ms/cm.

In certain embodiments, providing the acidified amine to the base swing chamber comprises changing a pH thereof from about 7.5 to about 12.5. In some embodiments, providing the acidified amine to the base swing chamber comprises changing a pH thereof from about 8 to about 12.

In some embodiments, providing the acidified amine to the base swing chamber results in a conductivity thereof from about 100 ms/cm to about 80 ms/cm. In certain embodiments, providing the acidified amine to the base swing chamber results in a conductivity thereof from about 95 ms/cm to about 85 ms/cm.

In certain embodiments, providing the alkalinized amine to the desalination chamber comprises maintaining a pH thereof from about 13 to about 12. In some such embodiments, providing the alkalinized amine to the desalination chamber comprises maintaining a pH thereof of about 13. In other such embodiments, providing the alkalinized amine to the desalination chamber comprises maintaining a pH thereof of about 12.5. In yet other such embodiments, providing the alkalinized amine to the desalination chamber comprises maintaining a pH thereof of about 12.

In some embodiments, providing the alkalinized amine to the desalination chamber results in a change in conductivity thereof from about 95 ms/cm to about 50 ms/cm. In certain embodiments, providing the alkalinized amine to the desalination chamber results in a change in conductivity thereof from about 90 ms/cm to about 60 ms/cm.

In certain embodiments, providing the protons and counterions to the acid swing chamber and providing the hydroxides and counterions to the base swing chamber takes place over a swing period from about 300 to about 400 minutes.

In some embodiments, providing the alkalinized amine to the desalination chamber is conducted over a desalination period from about 300 to about 400 minutes.

In certain preferred embodiments, the multi-chambered electrochemical cell for carbon dioxide is an electrochemical cell of the disclosure, or a plurality thereof.

For purpose of explanation and illustration, and not limitation, an exemplary embodiment of the system in accordance with the disclosed subject matter is shown in FIG. 1 and is designated generally by reference character 100. Similar reference numerals (differentiated by the leading numeral) may be provided among the various views and Figures presented herein to denote functionally corresponding, but not necessarily identical structures.

Referring now to FIG. 1, a schematic representation of an electrochemical flow cell for carbon dioxide removal is shown. Electrochemical cell 100 may be configured to be a five chamber electrochemical cell. Electrochemical cell 100 may be configured to be a four chamber electrochemical cell. Electrochemical cell 100 may be configured to be a three chamber electrochemical cell. Electrochemical cell 100 may be configured to have multiple and distinct electrochemical cells (in three, four, and/or five chamber configurations) electrically and fluidly connected together.

Electrochemical cell 100 (herein below referred to as cell 100) includes an anodic chamber 104 disposed at a first end of the electrochemical cell 100. Anodic chamber 104 includes an anode 108. Anodic chamber 104 may be a fully encapsulated or partially encapsulated volume configured to hold a liquid. In various embodiments, the liquid may be an electrolyte. In various embodiments, the liquid may be water. For the purposes of this disclosure, "electrolyte" is a medium containing ions that is electrically conducting through the movement of ions, but not conducting electrons. In various embodiments, one or more electrolytes may be disposed in anodic chamber 104 before the carbon dioxide absorption process. Anodic chamber 104 may hold a volume of 1 molar $H_2SO_4$ (sulfuric acid). In various embodiments, an electrolyte may include most soluble salts, acids, and bases dissolved in a polar solvent, such as water. Upon dissolving, the substance may separate into cations and anions, which will be discussed herein below, which disperse uniformly throughout the solvent.

Still referring to FIG. 1, anodic cell 104 may be configured to receive continuous fluid via one or pumps in fluid communication thereto. The one or more pumps similar to pump 144 (discussed below) may be adjustable in flow rate and/or fluid medium pumped therethrough. Anodic chamber 104 includes anode 108, anode 108 in various embodiments may be zinc, graphite, platinum, or another material or combination thereof. In various embodiments, the anode 108 may be a sacrificial anode. In various embodiments, anode 108 may be releasably suspended and/or fixed to anodic chamber 104. In various embodiments, anode 108 may be partially or fully submerged in water within anodic chamber 104. Anode 108 may be configured to generate protons from the liquid/electrolyte present in anodic chamber 104.

Still referring to FIG. 1, cell 100 includes an acid swing chamber 124 disposed adjacent to anodic chamber 104 and separated therefrom by a first cation exchange membrane (CEM) 120. Acid swing chamber 124 may be share one or more dimensions with anodic chamber 104 such as length, width, depth, volume, or surface area, to name a few. Acid swing chamber 124 may be configured to accept a fluid such as a liquid at a variable flow rate. Acid swing chamber 124 may include an intake port and an evacuation port, each disposed at one or more points of the chamber. For example and without limitation, acid swing chamber 124 may include two intake ports and one evacuation port, among other arrangements. Acid swing chamber 124 may include a volume of solution disposed within prior to the introduction of any fluids. In various embodiments, acid swing chamber 124 may include piperazine, e.g., at a concentration of about 0.9 M. In various embodiments, acid swing chamber 124 may include H+(protons) with a ratio of H+ to amine 148 of 1:1.

Acid swing chamber 124 may be configured to be compatible with one or more pumps such as pump 144. Pump 144 may be configured to pump a fluid, such as a liquid into acid swing chamber 124 at a variable and adjustable flow rate. In various embodiments, pump 144 may transport a carbon-dioxide loaded amine 148 at a variable and adjustable flow rate. Carbon dioxide-loaded amine 148 may be one or more compounds and functional groups that contain a basic nitrogen atom with a lone pair. Carbon dioxide-loaded amine 148 may be in liquid form. Amines may be derivatives of ammonia ($NH_3$), wherein one or more hydrogen atoms have been replaced by a substituent such as an alkyl or aryl group (these may respectively, may be called alkylamines and arylamines; amines in which both types of substituent are attached to one nitrogen atom may be called alkylarylamines). Suitable amines include amino acids, biogenic amines, trimethylamine, and aniline. Inorganic derivatives of ammonia are also called amines, such as monochloramine ($NClH_2$).

In certain preferred embodiments, carbon dioxide-loaded amine 148 may include piperazine. The piperazine (or other carbon-dioxide loaded amine) may be present at a molarity, e.g., from 0.1 to 10.0 M, such as 0.9 M. Carbon dioxide-loaded amine 148 may be pumped into one or more chambers of cell 100, e.g., at about 0.6-0.8 ml/min/A. The one or pumps 144 configured for moving liquids into and out of the chambers may include pumping at various flow rates.

In certain embodiments, carbon dioxide-loaded amine 148 is replaced by a molten salt solution, e.g., a salt of a group I element, wherein the molten salt solution comprises a molten salt which may act as a $CO_2$ sorbent. In certain such embodiments, the molten salt is a salt of at least one group I element. In certain embodiments, the molten salt is selected from LiOH, NaOH, KOH, $Li_2O$, $Na_2O$, and $K_2O$. In certain preferred embodiments, the molten salt comprises $Na^+$. In certain preferred embodiments, the molten salt is molten NaOH.

Still referring to FIG. 1, carbon dioxide-loaded amine 148 may be pumped into acid swing chamber 124 and acidified by the protons generated in the adjacent anodic chamber 104. The protons may travel through the first CEM 120, which is configured to be permeable to protons. The carbon dioxide-loaded amine 148 may be acidified by reacting with the protons entering acid swing chamber 124 through first CEM 120. Acid swing chamber 124 may include one or more pumps 144 fluidly connected thereto, the plurality of pumps configured to maintain a constant volume of fluid in the chamber. Acidification may drive carbon dioxide desorption from the carbon dioxide-loaded amine 148, allowing capture of the carbon dioxide released therein. The captured carbon dioxide may be vented from acid swing chamber 124 to a more permanent enclosure. The captured carbon dioxide may be vented from acid swing chamber 124 for use in one or more future processes. Acid swing chamber 124 may have a pH level of about 6. Each chamber of cell 100 may have one or more sensors configured to detect the pH level and one or more controllers configured to control one or more components configured to maintain a pH level in each of the chambers. Feedback control may be utilized to maintain pH level in acid swing chamber 124 within a certain predetermined threshold. Maintaining pH in acid swing chamber 124 may take the form of the plot shown in FIG. 6, in certain embodiments. Acid swing chamber 124 may vent oxygen after the chemical reaction takes place.

Still referring to FIG. 1, cell 100 includes a desalination chamber 140 disposed adjacent to acid swing chamber 124, desalination chamber 140 separated from said acid swing chamber 124 by a first anion exchange membrane (AEM) 152. Desalination chamber 140 may be located at the center of cell 100, according to various embodiments. In some embodiments desalination chamber 140 may be located at a first or second end of cell 100, disposed exterior to cell 100 and in fluid communication therewith, or a combination thereof. Desalination chamber 140 may include a solution disposed within prior to the introduction of any other fluids. In various embodiments, the solution may comprise piperazine, e.g., at a concentration of about 0.9 M. The solution in desalination chamber 140 may include NaCl (sodium chloride), e.g., at a concentration up to 1 M. The fluid in the desalination chamber 140 may be basic, e.g., having a pH of about 12. Desalination chamber 140 may include one or more controllers configured to receive feedback signals from one or more sensors, the controller configured to maintain a certain pH level through one or more other components. For example and without limitation, the one or more controllers may be electrically and communicatively connected to a plurality of pumps and/or chemical solutions, the controller configured to selectively pump the solution into the chamber to control pH. Feedback control may be utilized to maintain the pH level in desalination chamber 140 within a certain predetermined threshold. Maintaining a pH level in desalination chamber 140 may take the form of the plot shown in FIG. 6, in various embodiments.

Desalination chamber 140 may include a salt, e.g., wherein the salt is NaCl, $NaNO_3$, KCl or $KNO_3$, i.e., the chamber may comprise aqueous sodium chloride. In various embodiments, the salt of desalination chamber 140 may include one or more salts disclosed herein, or one or more other salts, alone or in combination. Desalination chamber 140 may be configured to provide one or more counterions for acid swing and/or base swing processes. The counterions may be provided as one or more of the salts mentioned above. Desalination chamber 140 may be configured to provide said counterions through one or more semipermeable membranes, which may, for example, be disposed adjacent to and separated from one or more destination chambers, such as acid swing chamber 124 and base swing chamber 132. For example and without limitation, desalination chamber 140 may provide sodium ions through second CEM 144 into acid swing chamber 124 and chloride ions through first AEM 152 into base swing chamber 132. These ions may be pumped along with amine 148 through various other chambers back to desalination chamber 140 to start the process over. Base swing chamber 132 may intake components and facilitate one or more reactions and generate the products.

Still referring to FIG. 1, first AEM 152 is configured to be permeable to hydroxide. First anion exchange membrane may be a semipermeable membrane configured to conduct anions but reject other materials such as oxygen and/or hydrogen atoms/molecules. In various embodiments, first anion exchange membrane 152 and any AEM may include ionomers. An ionomer may be a polymer composed of repeat units of both electrically neutral repeating units and ionized units covalently bonded to the polymer backbone as pendant group moieties. Usually no more than 15 mole percent are ionized. The ionized units are often carboxylic acid groups.

Ionomers may have desirable physical properties including electrical conductivity and viscosity—e.g., increase in ionomer solution viscosity with increasing temperatures. Ionomers also have desirable morphological properties as the non-polar polymer backbone is energetically incompatible with the polar ionic groups.

First AEM 152 may be configured to be the only means for separating acid swing chamber 124 from desalination chamber 140. First AEM 152 may include the entirety of a two-dimensional barrier between acid swing chamber 124 and desalination chamber 140 such as a generally flat sheet disposed therebetween. First AEM 152 may take any shape suitable for its configuration and permeability by the protons. First AEM 152 may include a circular, oblong, rectangular, or other polygonal shape. First AEM 152 may include separate and distinct AEMs fixed together. First AEM 152 may be configured to partially separate acid swing chamber 124 and desalination chamber 140. For example, acid swing chamber 124 may be separated by an impermeable wall made from a material suitable for electrochemical flow cells from desalination chamber 140, wherein only a portion of the impermeable wall is first AEM 152. In these embodiments, first AEM 152 may include a port, channel, cutout, sheet or other interstitial component of an impermeable barrier it may be disposed within.

Still referring to FIG. 1, cell 100 includes a base swing chamber 132. Base swing chamber 132 is configured to be in fluid communication with the acid swing chamber 124 and desalination chamber 140. Base swing chamber 132 is disposed adjacent to the desalination chamber 140 and separated therefrom by a second CEM 128. Second CEM 128 may be configured to be permeable by a plurality of atoms or molecules, said permeability further configured to alkalinize the amine present in the base swing chamber 132. For the purposes of this disclosure, an "alkali" is a base that dissolves in water. Base swing chamber 132 may include a solution disposed within prior to the introduction of any other fluids. In various embodiments, the solution may be piperazine, e.g., at a concentration of about 0.9 M. Additionally there may be HCl and NaOH may be present, as well as H+ (protons) and OH– (hydroxides).

Base swing chamber 132 may be in fluid communication with one or more pumps such as pump 144. One or more liquids, such as an acid, may be pumped or flowed into base swing chamber 132 where one or more hydroxide molecules are present, thereby neutralizing the liquid. In various embodiments the liquid may comprise amine 148. Base swing chamber 132 may have a pH of about 12. Base swing chamber 132 may include one or more controllers connected to one or more components configured to detect and maintain a certain pH level. Feedback control may be utilized to maintain a pH level in base swing chamber 132 within a certain predetermined threshold. Maintaining the pH level in base swing chamber 132 may take the form of the plot shown in FIG. 6, in various embodiments.

Still referring to FIG. 1, cell 100 includes a cathodic chamber 116 disposed at a second end of cell 100. Cathodic chamber 116 may be disposed at the opposite end of cell as anodic chamber 104. In various embodiments, cathodic chamber 116 may be disposed at the same end of cell 100 as anodic chamber 104. In various embodiments, cathodic chamber 116 may be in fluid communication with anodic chamber 104. In various embodiments, cathodic chamber 116 may be in fluid communication with base swing chamber 132, desalination chamber 140, and/or acid swing chamber 124, alone or in combination. Cathodic chamber 116 may be disposed adjacent to any one of the described chambers herein. In various embodiments, cathodic chamber 116 may be disposed adjacent to base swing chamber 132 and separated therefrom by second AEM 136. Cathodic chamber 116 includes a cathode 112. Cathode 112 may be an electrode from which a conventional current leave a polarized electrical device. Electrons may flow into the cathode 112. Cations move towards cathode 112 and anions move towards anode 108. Cathodic chamber 116 and cathode 112 is configured to generate hydroxides, e.g., from water.

Cathodic chamber 116 may have a pH of about 14. Cathodic chamber may include one or more controllers and components communicatively connected thereto, the controller and components configured to receive a feedback signal from one or more sensors and maintain pH level in response thereto. Cathodic chamber 116 may intake components and may facilitate reactions such as producing NaOH and venting $H_2$ as described herein.

In some embodiments, cathodic chamber 116 co-generates hydrogen gas. Cathodic chamber 116 may generate and capture the hydrogen gas. The hydrogen gas may be vented from cathodic chamber 116 separately or simultaneously with any other components produced or present within cathodic chamber 116. The hydrogen gas may be dissolved in one or more solutions and vented from cathodic chamber 116 as a liquid. The hydrogen gas may be pumped from cathodic chamber 116 by one or more pumps, such as pump 144. The hydrogen gas may be pumped to one or more subsequent chambers as described herein or to one or more vessels for disposal or further use.

Still referring to FIG. 1, cell 100 may include the following components in each of the five chambers at the beginning of the carbon dioxide removal process as detailed hereinbelow, in various non-limiting embodiments and ratios.

| Chamber | Anode | Acid Swing | Desalination | Base Swing | Cathode |
|---|---|---|---|---|---|
| Main Component | 1M $H_2SO_4$ | 0.9M Piperazine | 0.9M Piperazine | 0.9M Piperazine | 1M NaOH |
| Additional Supplement | N/A | HCl addition ($H^+$:amine ratio = 1:1) | NaCl addition to 1M | HCl & NaOH Addition ($H^+$:$OH^-$:amine = 1:1:1) | N/A |
| pH value | 0 | 6.0 | 12.0 | 12.0 | 14.0 |

One of skill in the art would appreciate the components, supplements, and pH value are merely examples representative of a plurality of possible combinations capable of continuously removing carbon dioxide from a fluid continuously.

Still referring to FIG. 1, cell 100 may introduce chemicals into one or more chambers and produce products due to chemical reactions according to the following chart.

| Chamber | Anode | Acid Swing | Desalination | Base Swing | Cathode |
|---|---|---|---|---|---|
| Entering Component | $H_2O$ | Amine-$CO_2$ | Regenerated Amine + NaCl | [AmineH$^+$]Cl$^-$ | $H_2O$ |
| Reaction | 2 $H_2O$(l) → $O_2$(g) + 4 $H^+$ (aq) + 4e$^-$ | AmineCO$_2$ + HCl → [AmineH$^+$]Cl$^-$ + $CO_2$ | N/A | [AmineH$^+$]Cl$^-$ + NaOH → Amine + $H_2O$ + NaCl | 4 $H_2O$(l) + 4e$^-$ → 2$H_2$(g) + 4 $OH^-$(aq) |
| Ion Migration | $H^+$ to Acid Swing | $H^+$ from Anode; Cl$^-$ from Desal. | Na$^+$ to Base Swing; Cl$^-$ to Acid Swing | $OH^-$ from Cathode; Na$^+$ from Desal | $OH^-$ to Base Swing |
| Product | $H_2SO_4$ | [AmineH$^+$]Cl$^-$ + $CO_2$ | Regenerated amine | Regenerated amine + NaCl | NaOH |
| Exit Component | $O_2$ (vent) | $CO_2$ (vent); [AmineH$^+$]Cl$^-$ (Base Swing) | Regenerated amine | Regenerated amine + NaCl | $H_2$ (vent) |

The above chart also details exemplary embodiments of products produced in each chamber as well as the components that exit each chamber, for example, vented components and those components that travel to one or more subsequent chambers. One of skill in the art would appreciate that these are merely examples of components and concentrations that may be used according to the description of cell 100, and does not limit the components, concentrations, reactions or any aspect thereof to remove carbon dioxide from a fluid.

Figure 2:
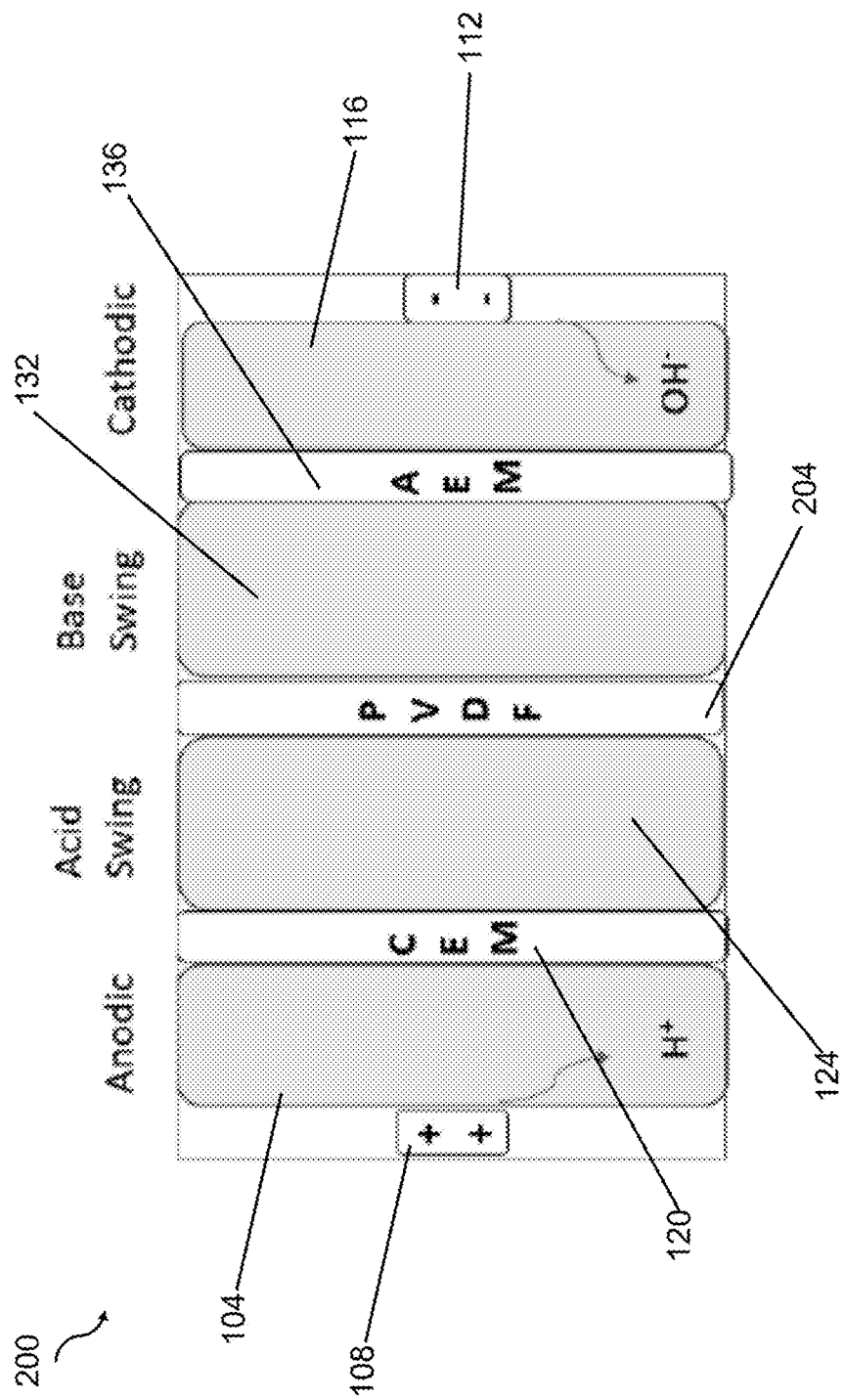
FIG. 2 is a schematic representation of an electrochemical flow cell for carbon dioxide removal in accordance with the disclosed subject matter.

Referring now to FIG. 2, cell 200 is shown in schematic view. In general, cell 200 is configured similarly to cell 100 for carbon dioxide removal. Cell 200 shows a four chamber configuration. Cell 200 may include one or more pumps fluidly connected to each of the chambers. The one or more pumps may be configured to maintain a certain amount of fluid, such as amine solution, in each chamber. The one or more pumps may be configured to maintain a certain pH level in each of the chambers. Cell 200 may be configured to reduce electrode spacing as compared to the five-chamber embodiment of cell 100. The reduced electrode spacing leads to lower ion transport length. The reduction in ion transport lengths leads to enhanced energy efficiency due to lower ionic resistance. Additionally, the reduced number of chambers reduces the electrochemical cell's footprint, membrane requirement, and electrolyte utilization. While the five-chamber embodiment included a first and second CEM and AEMs, cell 200 includes, in embodiments, one AEM and CEM each. A membrane may separate the acid and base swing chambers and electrodes (the anode and cathode) as described herein below. In some embodiments, the membrane may also be an ion exchange membrane wherein there are two AEMs and one CEM disposed in cell 200. One of ordinary skill in the art would appreciate that the ion exchange membrane may be configured to allow a plurality of arrangements of both AEMs and CEMs present in an electrochemical cell, such as cell 200.

Still referring to FIG. 2, cell 200 includes an anodic cell 104. Anodic cell 104 includes an anode 108. Anodic cell 104 may be configured to receive continuous fluid via one or more pumps in fluid communication thereto. The one or more pumps, such as pump 144 may be adjustable in flow rate and/or fluid medium pumped therethrough. Anodic chamber 104 includes anode 108, anode 108 in various embodiments may be zinc, graphite, platinum, or another material or combination thereof. In various embodiments, the anode 108 may be a sacrificial anode. In various embodiments, anode 108 may be releasably suspended and/or fixed to anodic chamber 104. In various embodiments, anode 108 may be partially or fully submerged in water within anodic chamber 104. Anode 108 may be configured to generate protons from the liquid/electrolyte present in anodic chamber 104. Anodic chamber 104

Still referring to FIG. 2, cell 200 includes acid swing chamber 124. Acid swing chamber 124 may be disposed adjacent to anodic chamber 104 and separated therefrom by a CEM 120. Acid swing chamber 124 may be share one or more dimensions with anodic chamber 104 such as length, width, depth, volume and/or surface area. Acid swing chamber 124 may be configured to accept a fluid such as a liquid at a variable flow rate. Acid swing chamber 124 may include an intake port and an evacuation port, each disposed at one or more points of the chamber. For example and without limitation, acid swing chamber 124 may include two intake ports and one evacuation port, among other arrangements. Acid swing chamber 124 may be configured to be compatible with one or more pumps such as pump 144. Pump 144 may be configured to pump a fluid, such as a liquid into acid swing chamber 124 at a variable and adjustable flow rate. In various embodiments, pump 144 may transport a carbon-dioxide loaded amine 148 at a variable and adjustable flow rate.

Still referring to FIG. 2, carbon dioxide-loaded amine 148 may be pumped into acid swing chamber 124 and acidified by the protons generated in the adjacent anodic chamber 104. The protons may travel through the CEM 120, which is configured to be permeable to protons. The carbon dioxide-loaded amine 148 may be acidified reacting with the protons entering acid swing chamber 124 through CEM 120. Acid swing chamber 124 may include one or more pumps 144 fluidly connected thereto, the plurality of pumps configured to maintain a constant volume of fluid in the chamber. Carbon dioxide-loaded amine 148 may have the carbon dioxide desorbed during the acidification process therein. The captured carbon dioxide may be vented from acid swing chamber 124 for use in one or more future processes. Acid swing chamber 124 may have a pH level of about 6. Each chamber of cell 100 may have one or more sensors configured to detect the pH level and one or more controllers configured to control one or more components configured to maintain a pH level in each of the chambers.

Still referring to FIG. 2, cell 200 includes base swing chamber 132 in fluid communication with acid swing chamber 124. Base swing chamber 132 may be disposed adjacent to acid swing chamber 124 and separated therefrom by a membrane 204. Membrane 204 may be polyvinylidene fluoride (PVDF). PVDF may be a highly non-reactive thermoplastic fluoropolymer produced by the polymerization of vinylidene difluoride. PVDF may be high purity, resistant to solvents, acids, and hydrocarbons. Membrane 204 may be injected, molded or welded. Membrane 204 may include a cross-linked closed-cell foam. Membrane 204 may exhibit increased chemical resistance and compatibility with strong acids, weak acids, ionic, salt solutions, halogenated compounds, hydrocarbons, aromatic solvents, aliphatic solvents, oxidants and weak bases. Membrane 204 may be non-ionic. Second CEM 128 may be configured to be permeable by a plurality of atoms or molecules, said permeability further configured to alkalinize the amine present in the base swing chamber 132. Base swing chamber 132 may be in fluid communication with one or more pumps such as pump 144. One or more liquids, such as an acid, may be pumped or flowed into base swing chamber 132 wherein one or more hydroxide molecules are present, thereby neutralizing the liquid. In various embodiments the liquid may comprise amine 148. Base swing chamber 132 may include a pH level of about 12. Base swing chamber 132 may include one or more controllers connected to one or more components configured to detect and maintain a certain pH level.

Still referring to FIG. 2, cell 200 includes catholic chamber 116. Cathodic chamber 116 includes cathode 112. Cathode 112 may be configured to dissociate water into hydroxide. In various embodiments, cathodic chamber 116 may be in fluid communication with anodic chamber 104. In various embodiments, cathodic chamber 116 may be in fluid communication with base swing chamber 132, desalination chamber 140, and/or acid swing chamber 124, alone or in combination. Cathodic chamber 116 may be disposed adjacent to any one of the described chambers herein. Cathodic chamber 116 includes a cathode 112. Cathode 112 may be an electrode from which a conventional current leaves a polarized electrical device. Electrons may flow into the cathode 112. Cations move towards cathode 112 and negatively charge anions move towards anode 108. Cathodic chamber 116 and cathode 112 is configured to generate hydroxides, e.g., from water.

Still referring to FIG. 2, cathodic chamber 116 is disposed adjacent to base swing chamber 132 and separated therefrom by AEM 136. AEM 136 is configured to be permeable to hydroxides. First anion exchange membrane may be a semipermeable membrane configured to conduct anions but reject other materials such as oxygen and/or hydrogen atoms/molecules. In various embodiments, first anion exchange membrane 152 and any AEM may include ionomers.

Figure 3:
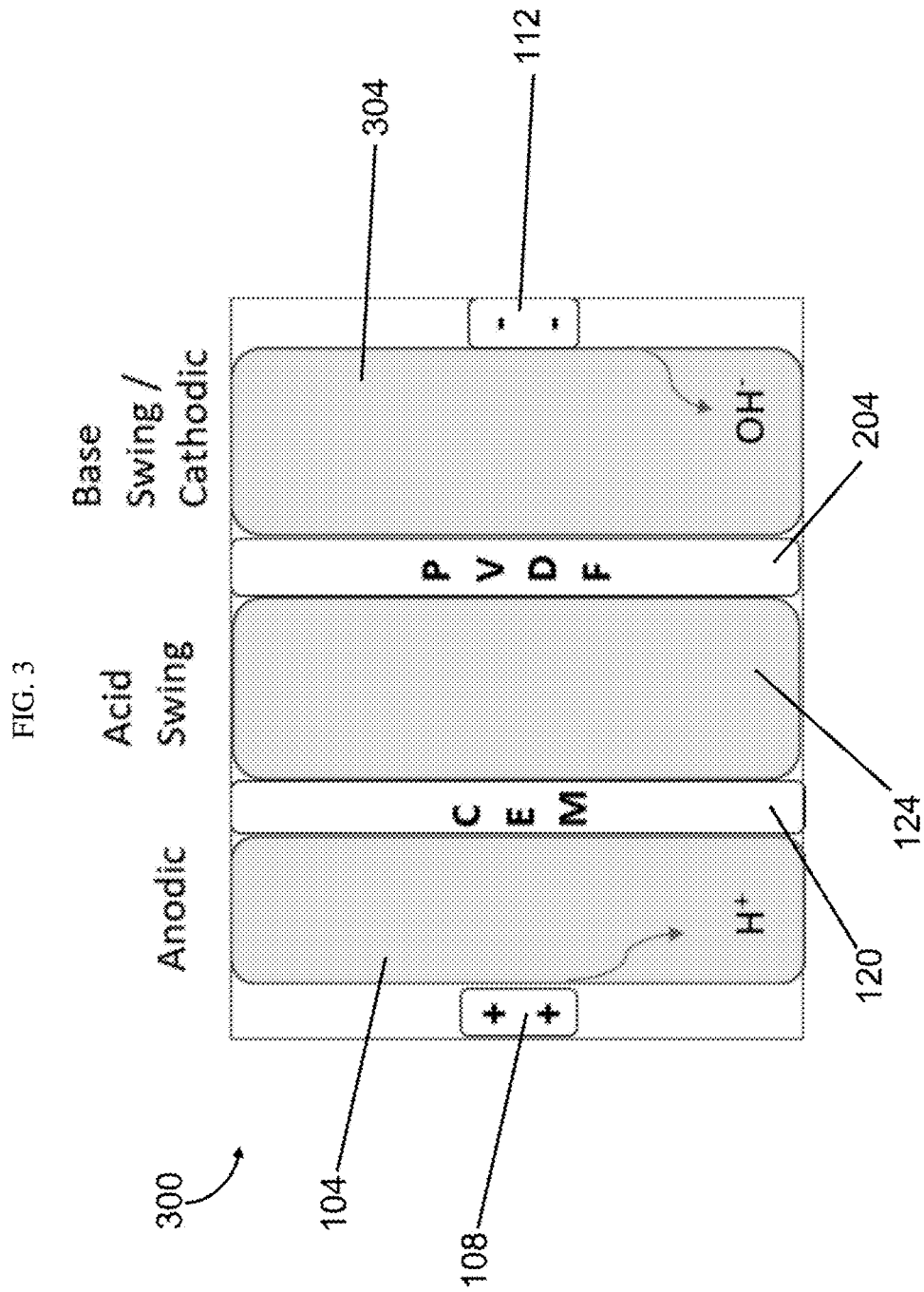
FIG. 3 is a schematic representation of an electrochemical flow cell for carbon dioxide removal in accordance with the disclosed subject matter.

Referring now to FIG. 3, an electrochemical cell 300 (hereinafter referred to as cell 300) is shown in schematic form. Cell 300 is configured as a three-chamber electrochemical cell. Cell 300 reduces the electrochemical cell's footprint compared to the five- and four-chamber embodiments. The smaller footprint leads to lower ion transport length and enhanced energy efficiency due to lower ionic resistance. Additionally the membrane requirement and electrolyte utilization is lowered due to the reduction in chambers. In embodiments of cell 300, anion exchange membrane (AEM) separating base swing chamber and cathodic chamber is removed, thereby exposing the acidified solvent (amine 148) to the hydroxides produced at cathode 112, and removing the need for those hydroxides to traverse the membrane.

Cell 300 includes anodic chamber 104, anodic chamber 104 includes anode 108. Anodic chamber 104 may be similar to or the same as any anodic chamber as described herein. Anodic chamber 104 may be disposed as a first end of cell 300 and laterally adjacent to acid swing chamber 124. Acid swing chamber 124 may be the same as or similar to any acid swing chamber 124 as described herein. Cell 300 includes base swing/cathodic chamber 304 disposed at a second end of cell 300 opposite anodic chamber 104. Base swing/cathodic chamber 304 includes cathode 112 disposed within the chamber. As described in reference to electrodes herein above, cathode 112 may be partially or fully submerged within the water of base swing/cathodic chamber 304.

Figure 4:
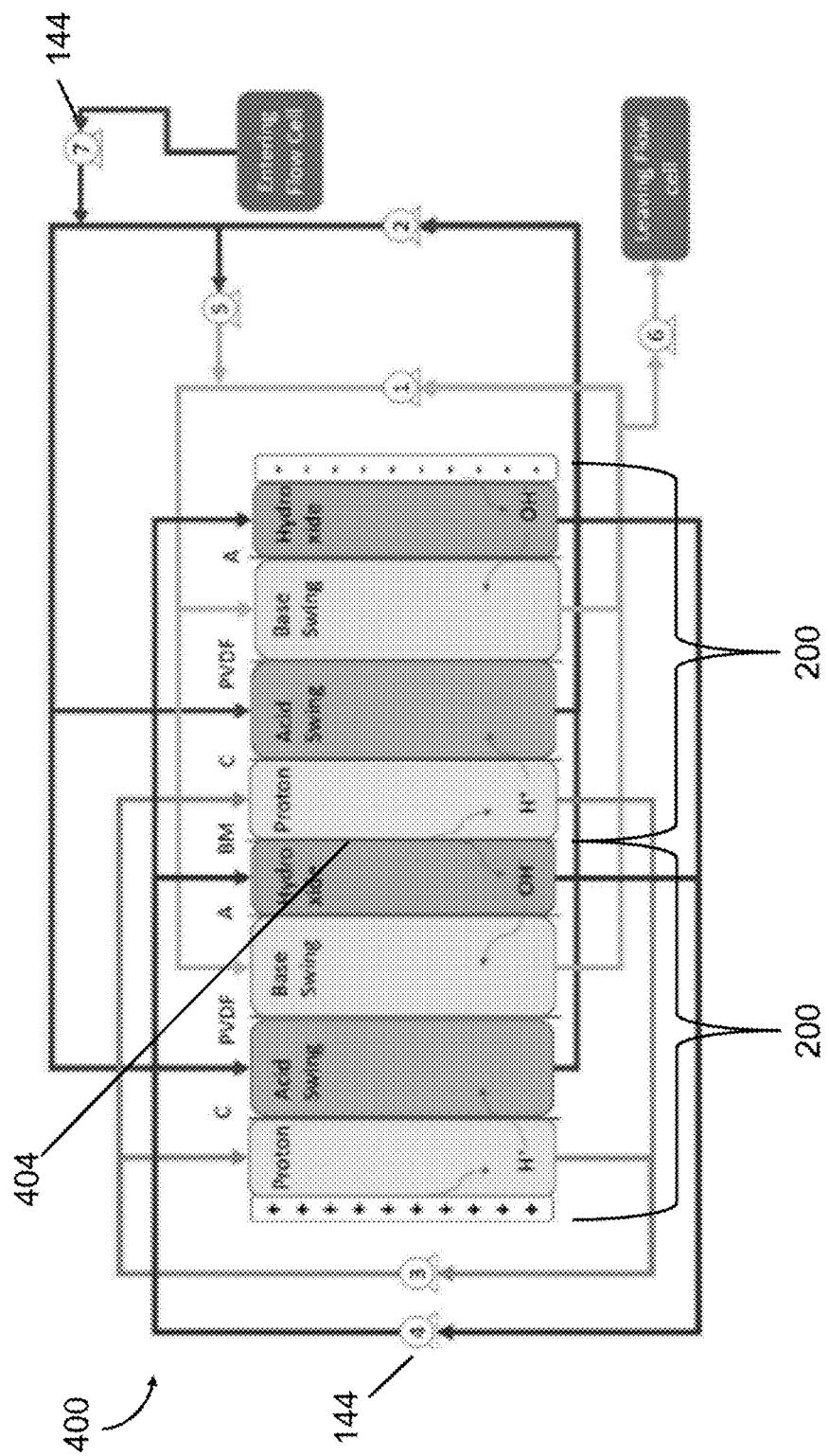
FIG. 4 is a schematic representation of a cell stack configuration of a plurality of electrochemical flow cells for carbon dioxide removal in accordance with the disclosed subject matter.

Referring now to FIG. 4, cell stack 400 is shown in schematic view. Cell stack 400 may include a plurality of separate and distinct cells as described herein fluidly and electrically connected together in parallel and/or series. In various embodiments, cell stack 400 may include a plurality of cells 200 connected together and configured to increase the total volume of each type of chamber. For example and without limitation, a plurality of cells 200 may be connected together, wherein the output of a first cell 200 is connected to the input of a second cell 200. In various embodiments, the input of a first cell 200 may be split such that the input is also connected to the input of a second cell 200. In such embodiments, the source of carbon dioxide-loaded amine 148 may be doubled in flow rate in order to properly run each of the electrochemical cells 200. According to FIG. 4, each of the plurality of distinct electrochemical cells 200 are separated by a bipolar membrane, the bipolar membrane 404. Bipolar membrane 404 may be configured to dissociate water into protons and hydroxides. As can be seen in FIG. 4, the common chambers between the distinct cells, for sake of explanation, the anodic chambers may be commonly and fluidly connected. In some embodiments, an outlet in each of the anodic chambers may be fluidly connected to at least one pump, the pump configured to move water back to an inlet in each of the anodic chambers. For example and without limitation, each of the cathodic chambers, acid swing chambers, and base swing chambers, may be connected from distinct outlets, through pumps, to distinct intakes. The acid swing chambers may be configured to have an intake line for newly introduced carbon dioxide-loaded amine 148 pumped in with the recycled electrolyte. Similarly, the base swing chambers may be configured to include an outlet line for electrolyte to leave the electrochemical cell stack 400. In various embodiments, the intake line traveling to and from the acid swing chambers may include a connection to the base swing chambers as described in reference to FIG. 1-3. One of ordinary skill in the art would appreciate that the individual and distinct cells (200) may include a plurality of chamber configurations such as cell 100 and cell 300, in various embodiments.

Figure 5:
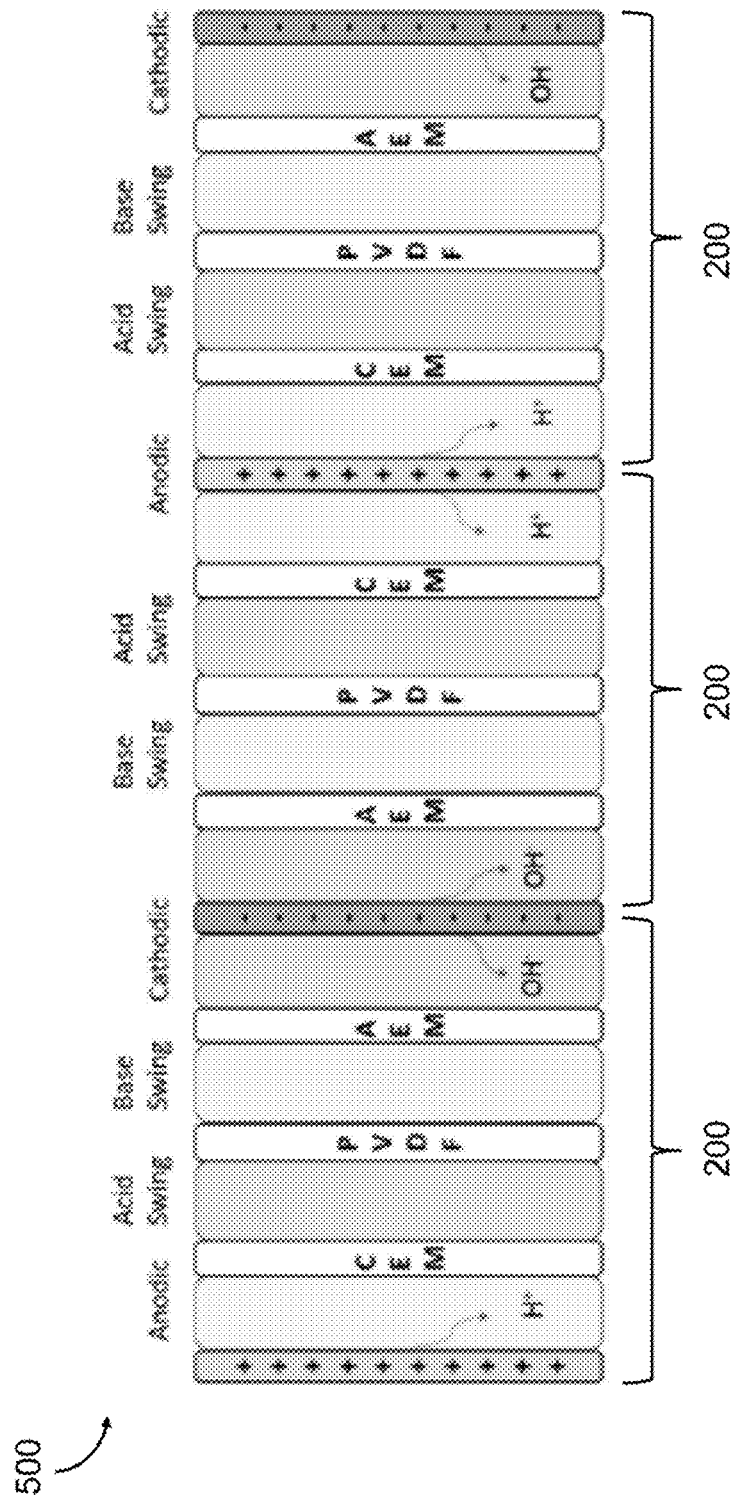
FIG. 5 is a schematic representation of a cell stack configuration of a plurality of electrochemical flow cells for carbon dioxide removal in accordance with the disclosed subject matter.

Referring now to FIG. 5, a cell stack 500 is shown in schematic view. Cell stack 500 may include a plurality of cells 200 electrically connected and in fluid communication together in parallel. Cell stack 500 may increase the total volume of carbon dioxide-loaded amine 148 that is capable of being handled by the electrochemical cell stack 500. Cell stack 500 may include three distinct cells 200, but one of ordinary skill in the art would appreciate cell stack 500 may include a plurality of cells. For example, and without limitation, cells stack 500 may include two, four, five, ten, or 100 cells 200. In various embodiments cell stack 500 may include cell 100, 200, or 300. Cell stack 500 may include a bipolar membrane 404 to separate distinct cells. In various embodiments, each cell (100, 200, 300) may be separated by walls configured to be anodes and/or cathodes. In some embodiments, due to adjacent anodic and cathodic chambers sharing anodes and cathodes, respectively, between distinct cells, the configuration of chambers in adjacent cells may vary. For example, and without limitation, the anodic chamber may be disposed left of the cathodic chamber in a first cell 200, and opposite in a second cell 200, and the first configuration in a third cell 200.

Figure 6:
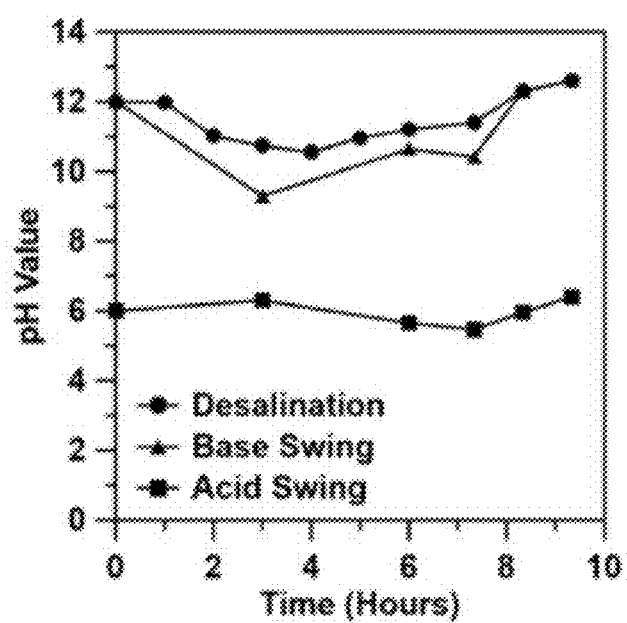
FIG. 6 is a plot of pH value over time of each of the desalination chamber, base swing chamber and acid swing chamber in accordance with the disclosed subject matter.
Figure 7A:
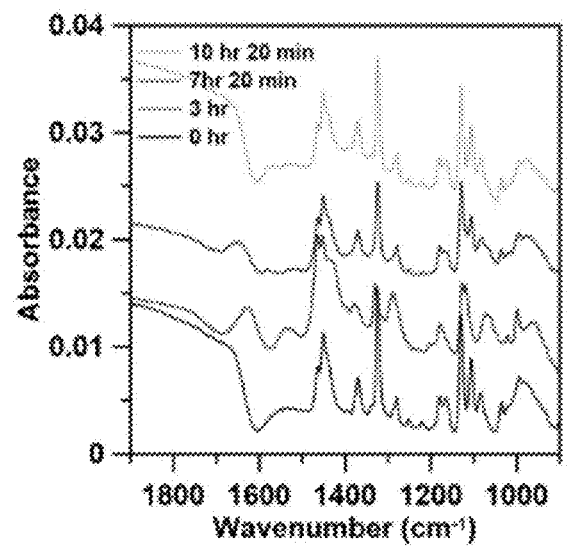
FIG. 7A-B are plots of absorbance versus wavenumber ($cm^{-1}$) representing the successful carbon dioxide removal as a comparison of the base swing chamber versus the acid swing chamber at different time points.
Figure 7B:
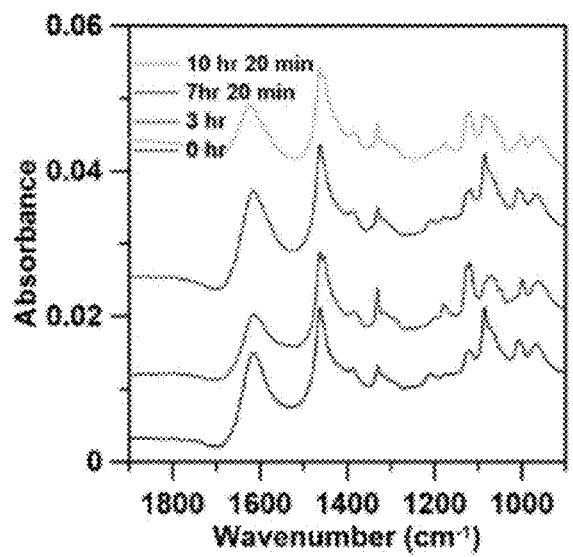

Referring now to FIGS. 6 and 7A-7B. FIG. 6 shows the pH value in each of the base swing chamber, desalination chamber, and acid swing chamber over a period of about 10 hours. This shows the ability of the system as described to control pH value utilizing one or more sensors and controllers and/or flow rates of the components and ratios thereof as described herein. FIGS. 7A and 7B show absorbance plots vs wavenumber in IR spectrum. The pH fluctuation of FIG. 6 can be verified by IR spectrum of FIG. 7A-B. Successful $CO_2$ desorption, piperazine acidification and regeneration are shown in FIG. 7B. In FIG. 7B, piperazine acidification can be verified by distinct and characteristic peaks at 1615 $cm^{-1}$. Across all of the sampled times in the acid swing chamber, the IR spectra confirm high degrees of desorption of the $CO_2$ and no presence of $CO_2$-loaded piperazine (characteristic peaks at 1290, 1240 and 1540 $cm^{-1}$). This validates that $CO_2$ was desorbed in acid swing chamber during the continuous electrochemical regeneration process. In FIG. 7A, it is shown that protonated form of piperazine (1615 $cm^{-1}$) appears in base swing cell during 3 hour and 7 hour 20 min time point. However, this peak disappears at 10 hours 20 min, making its spectrum identical to that of fresh piperazine. This validates that acidified amine can be successfully regenerated with a proper pH feedback control in a continuous 5-chamber electrochemical regeneration operation.

Figure 8:
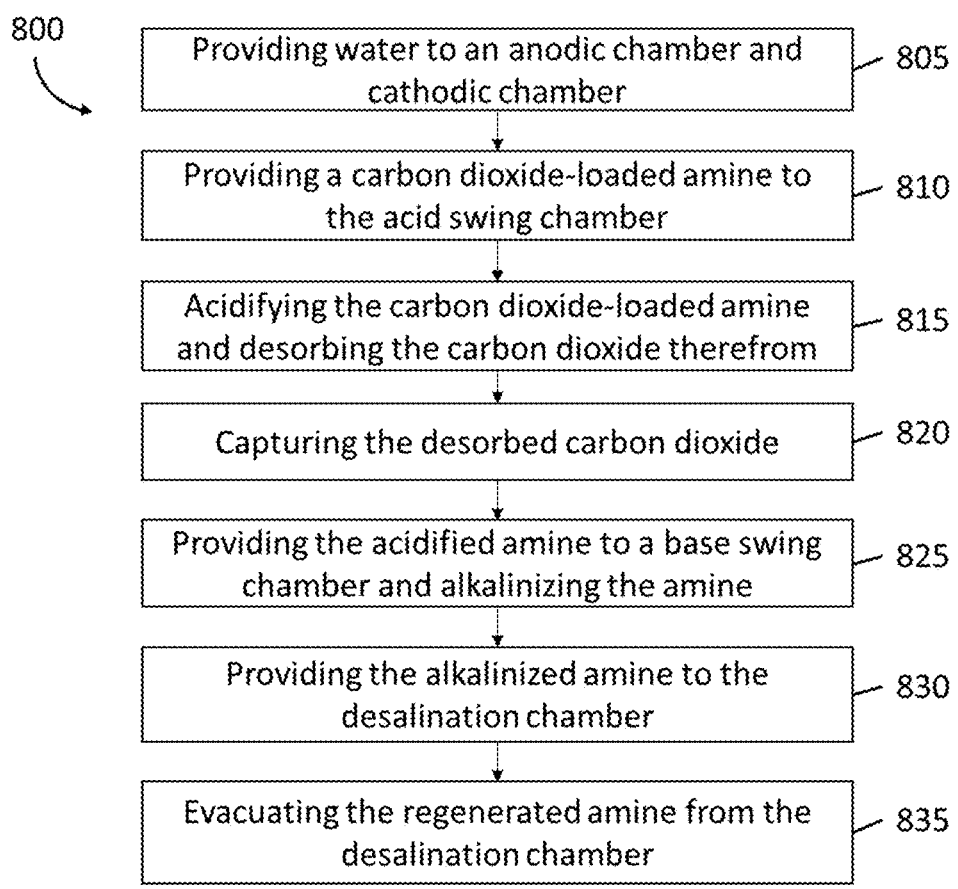
FIG. 8 is a flow diagram representing a method for continuous carbon dioxide removal utilizing an electrochemical cell.

Referring now to FIG. 8, a method 800 for a multi-chambered electrochemical cell for carbon dioxide removal is shown in flow diagram form. Method 800 includes, at step 805, providing water to an anodic and chamber. Providing water to an anodic and cathodic chamber may include providing water to an anode and a cathode. The anodic chamber is configured to generate protons. The cathodic chamber is configured to generate hydroxides. The anodic chamber may be similar to or the same as anodic chamber 104. The cathodic chamber may be similar to or the same as cathodic chamber 116. The water may be provided to the anodic and cathodic chambers by one or more pumps configured for use with water. The water may be provided continuously. The water may be provided at an adjustable flow rate. The output from anodic chamber 104 may be sulfuric acid and oxygen, the sulfuric acid and oxygen vented from anodic chamber 104 through one or more outlets. Cathodic chamber 116 may be configured to capture the co-generated hydrogen gas. The hydrogen gas may be formed at the cathode and captured in the cathodic chamber 116 in gaseous form. The co-generated hydrogen gas may be vented from cathodic chamber 116 in gaseous form. The co-generated hydrogen may be dissolved in one or more solutions and pumped out of an outlet in cathodic chamber 116 as described herein above. The hydrogen gas may be pumped from cathodic chamber 116 by one or more pumps, such as pump 144. The hydrogen gas may be pumped to and/or through one or more subsequent chambers as described herein or to one or more vessels for disposal. In some embodiments, captured hydrogen gas may be pumped to one or more vessels outside of the electrochemical cell and stored for further use. In some embodiments, the vented hydrogen gas may be immediately utilized.

The method 800 further includes, at step 810, providing a carbon dioxide loaded amine to an acid swing chamber. The carbon dioxide loaded amine may be carbon dioxide-loaded amine 148 as described herein, e.g., piperazine, bonded with carbon dioxide molecules. Carbon dioxide-loaded amine 148 may be 0.1-10 M piperazine (e.g., 0.9 M piperazine) bonded with carbon dioxide molecules. Carbon dioxide loaded amine 148 may be provided to acid swing chamber 124 (e.g., at about 0.69 ml/min/A) A by one or more pumps. Acid swing chamber 124 may be in ionic communication with the anodic chamber 104 and a desalination chamber 140.

The method 800 includes, at step 815, providing the protons and the counterions to acid swing chamber 124, thereby acidifying the carbon dioxide-loaded amine 148 and desorbing the carbon dioxide therefrom. Protons generated at the anode 108 may migrate through a CEM such as first CEM 120. First CEM 120 may be a semipermeable membrane that only allows the protons to pass through to acid swing chamber 124. The desalination chamber is configured to provide a plurality of counterions. In some embodiments, the counterion may be NaCl, $NaNO_3$, KCl, and $KNO_3$, among others. In some embodiments wherein NaCl is used, chloride ions migrate into the acid swing chamber 124 as a counterion.

The method 800, includes, at step 820, capturing the desorbed carbon dioxide. The carbon dioxide may be desorbed from the carbon dioxide-loaded amine 148 and captured in acid swing chamber 124. The desorbed carbon dioxide may be vented from acid swing chamber 124. The desorbed carbon dioxide may be dissolved in a solution and pumped out of an outlet in acid swing chamber 124. The desorbed carbon dioxide can be preprocessed for use outside of the electrochemical cells/cell stack as described herein.

The method 800, at step 825, includes providing the acidified amine 148 to a base swing chamber 132. Base swing chamber 132 may be in ionic communication with the cathodic chamber 116 and desalination chamber 140. Acidified amine 148 may include amine and HCl. The acidified amine 148 may be pumped into base swing chamber 132 by one or pumps. Step 825 includes, providing the hydroxides from cathodic chamber 116 and the plurality of sodium ions from desalination chamber 140, thereby alkalinizing the amine 148, thus regenerating the amine 148 for subsequent carbon dioxide absorption together with, e.g., sodium chloride molecules.

The method 800, at step 830, includes providing the alkalinized amine to the desalination chamber 140. The regenerated amine 148 may bring the plurality of sodium chloride molecules back to desalination chamber 140 for subsequent ion migration to acid swing chamber 124 and base swing chamber 132. The regenerated amine 148 may be pumped to desalination chamber 140 by one or more pumps such as pump 144 as described herein. Regenerated amine may be bonded to one or more molecules before and after regeneration.

The method 800, at step 835, includes evacuating the regenerated amine 148 from the desalination chamber 140. The regenerated amine 148 may leave the sodium chloride molecules for subsequent ion migration and be vented out of desalination chamber 140. Regenerated amine 148 may be pumped out desalination chamber 140 by one or more pumps, and pumped into another chamber such as one of the chambers of cell stack 400 and/or cell stack 500. The method 800, in some embodiments, may include controlling a pH level in each of the acid swing chamber, the base swing chamber and the desalination chamber via feedback control. In some embodiments, the main component and supplemental components in each of the chambers as described may be maintained at the given pH levels by one or more controllers and at least one sensor configured to detect the pH level in each of the chamber.

Figure 9:
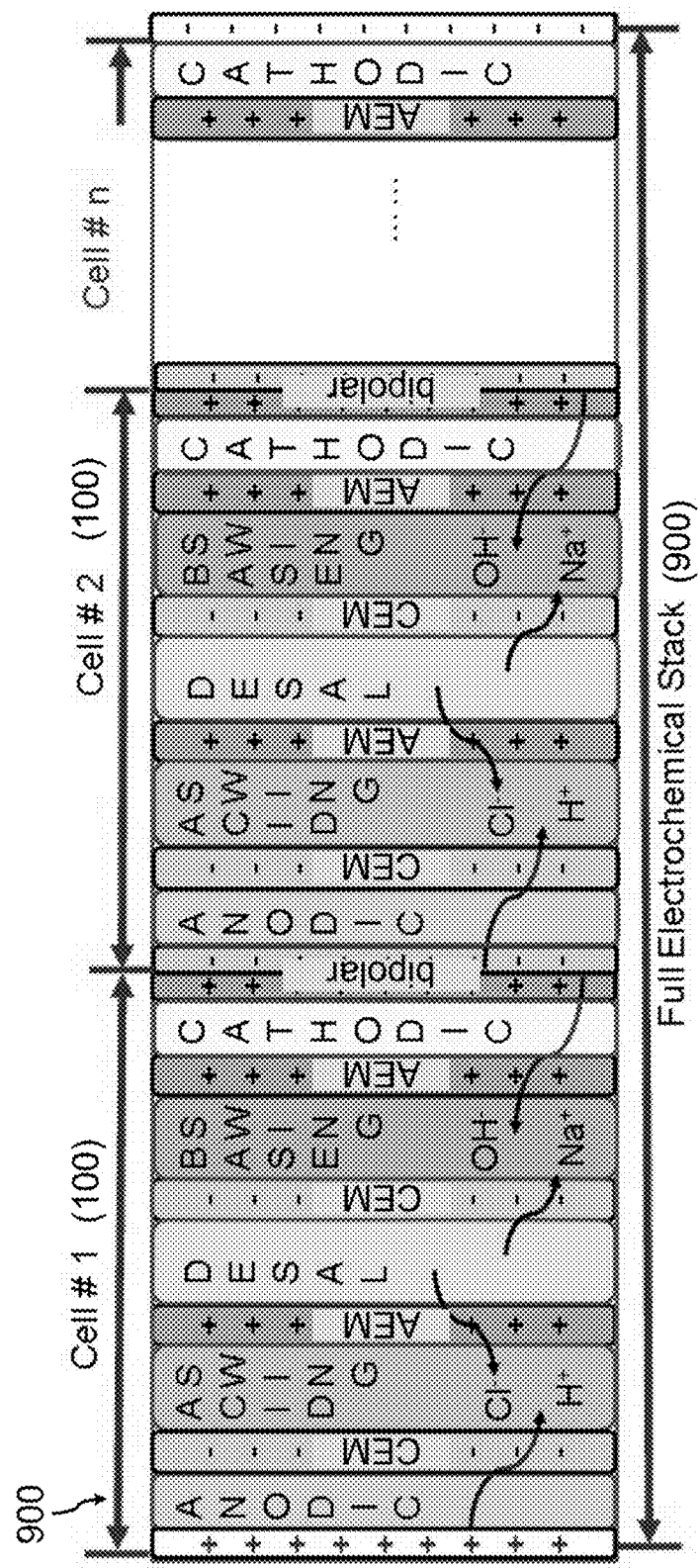
FIG. 9 is a schematic representation of an exemplary electrochemical cell stack configuration of a plurality of distinct five-chambered electrochemical cells each comprising an anodic chamber, an acid swing chamber, a desalination chamber, a base swing chamber, and a cathodic chamber.

Referring now to FIG. 9, a cell stack 900 is shown in schematic view. In certain embodiments, cell stack 900 comprises a plurality of cells 100 electrically connected and in fluid communication, preferably together in sequence. Cell stack 900 may increase the total volume of carbon dioxide-loaded amine 148 that is capable of being handled by the electrochemical cell stack 900. Cell stack 900 may comprise three distinct cells 100, but one of skill in the art would appreciate cell stack 900 may include a plurality of cells. For example and without limitation, cell stack 900 may comprise two, four, five, ten, 100, 150, 200, 250, 300, 350, or 400 cells 100. In certain preferred embodiments, cell stack 900 comprises from about 100 to about 300 cells 100. In certain such preferred embodiments, cell stack 900 comprises about 100 cells 100. In other preferred embodiments, cell stack 900 comprises about 200 cells 100. In other preferred embodiments, cell stack 900 comprises about 300 cells 100. Cell stack 900 may, in certain preferred embodiments, include a bipolar membrane 404 to separate distinct cells. In various embodiments, each cell 100 may be separated by walls configured to be anodes and/or cathodes. In some embodiments, due to adjacent anodic and cathodic chambers sharing anodes and cathodes, respectively, between distinct cells, the configuration of chambers in adjacent cells may vary. For example and without limitation, the anodic chamber may be disposed left of the cathodic chamber in a first cell 100, and opposite in a second cell 100, and the first configuration in a third cell 100. In certain embodiments, cell stack 900 is used in place of cell stack 100 in an exemplary system according to FIG. 1.

Figure 11:
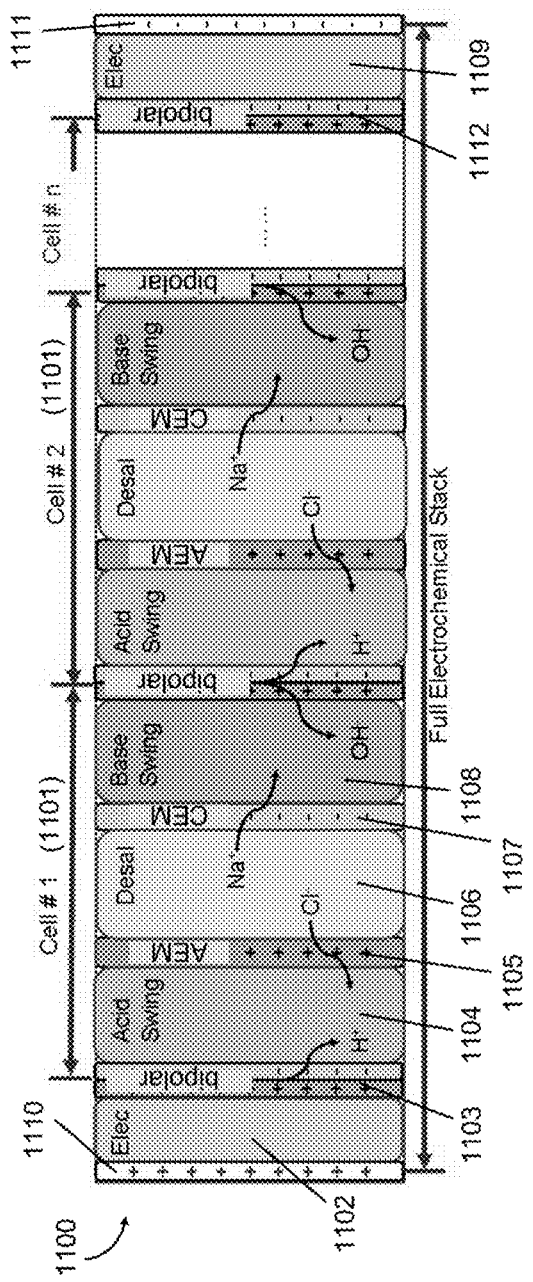
FIG. 11 is a schematic representation of an exemplary electrochemical cell stack configuration of a plurality of distinct three-compartment electrochemical cells, each comprising an acid swing chamber, desalination chamber, and base swing chamber.
Figure 12A:
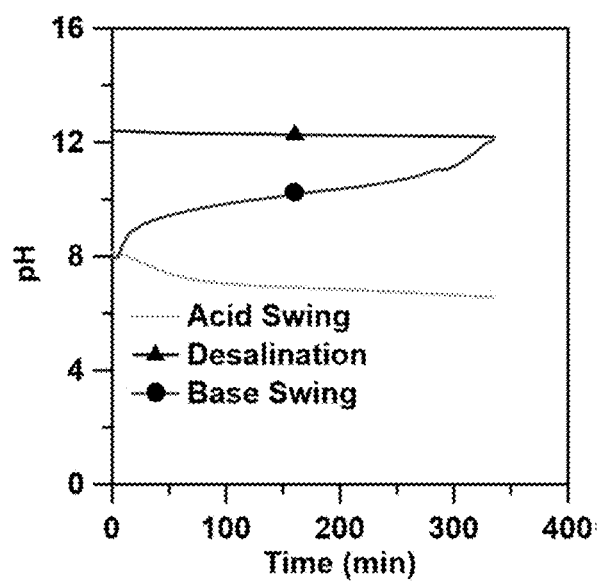
FIG. 12A is a plot displaying the measured pH over time of the acid swing, base swing, and desalination chambers of an exemplary three-chambered cell of the disclosure.
Figure 12B:
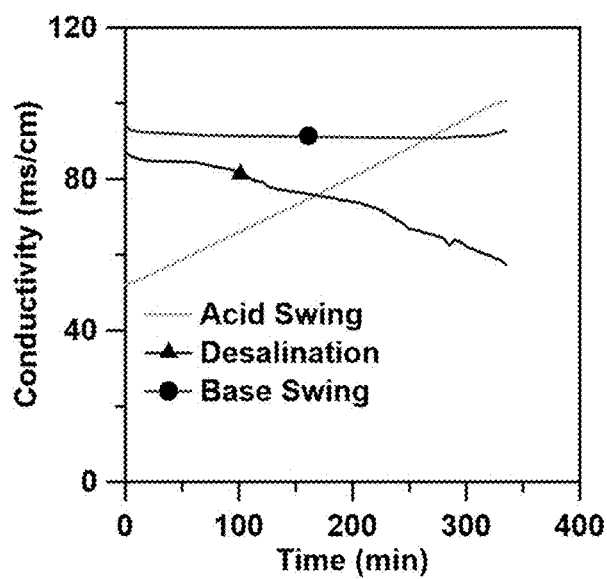
FIG. 12B is a plot displaying the measured conductivity over time of the acid swing, base swing, and desalination chambers of an exemplary three-chambered cell of the disclosure.

Referring now to FIG. 11, an exemplary cell stack 1100 is shown in schematic view. Cell stack 1100 comprises at least one electrochemical cell 1101 electrically connected and in fluid communication, preferably in sequence. In certain such embodiments, cell stack 1100 comprises: a first electrochemical cell 1101, the first electrochemical cell 1101 comprising:

a first acid swing chamber 1104 disposed at a first end of the first electrochemical cell 1101;
a first desalination chamber 1106, the first desalination chamber 1106 separated from the first acid swing chamber 1104 by a first anion exchange membrane 1105; and
a first base swing chamber 1108 disposed at a second end of the first electrochemical cell 1101 and in fluid communication with the first acid swing chamber 1104 and the first desalination chamber 1106, wherein the first base swing chamber 1108 is disposed adjacent to the first desalination chamber 1106 and separated therefrom by a first cation exchange membrane 1107;
a first anodic chamber 1102, comprising an anode 1110, disposed adjacent to the first end of the first electrochemical cell 1101, separated therefrom by a first bipolar exchange membrane 1103;
a first cathodic chamber 1109, comprising a cathode 1111, adjacent to the second end of the first electrochemical cell 1101, separated therefrom by a second bipolar exchange membrane 1112; and
wherein the first electrochemical cell 1101, the first anodic chamber 1102, and the first cathodic chamber 1109 are in fluid and electrical communication.

Still referring to FIG. 11, Cell stack 1100 may comprise additional distinct cells 1101, and one of skill in the art would appreciate cell stack 1100 may include a plurality of n cells 1101. For example and without limitation, cell stack 1100 may comprise two, four, five, ten, 100, 150, 200, 250, 300, 350, or 400 cells 1101. In certain preferred embodiments, cell stack 1100 comprises from about 100 to about 300 cells 1101. In certain such preferred embodiments, cell stack 1100 comprises about 100 cells 1101. In other preferred embodiments, cell stack 1100 comprises about 200 cells 1101. In other preferred embodiments, cell stack 1100 comprises about 300 cells 1101. Cell stack 1100 may include a bipolar membrane 404 to separate distinct cells.

Still referring to FIG. 11, cell 1101 may introduce chemicals into one or more chambers and produce products due to chemical reactions according to the following chart:

| Chamber | Acid Swing | Desalination | Base Swing Cathodic |
|---|---|---|---|
| Entering Component | $H_2O$ Amine-$CO_2$ | Regenerated Amine + NaCl | $H_2O$ AmineHCl |
| Reaction | 1. $H_2O_{(l)} \rightarrow H^+_{(aq)} + OH^-_{(aq)}$ (To base swing comp.) <br> 2. Amine-$CO_2$ + HCl → Amine-HCl + $CO_2$ | N/A | 1. $H2O_{(l)} \rightarrow H^+_{(aq)}$ (To acid swing comp.) + $OH^-_{(aq)}$ <br> 2. Amine-$HCl^-$ + NaOH → Amine + $H_2O$ + NaCl |
| Ion Migration | $H^+$ generated by bipolar membrane <br> $Cl^-$ from Desal. | $Na^+$ to Base Swing <br> $Cl^-$ to Acid Swing | $OH^-$ generated by Bipolar membrane <br> $Na^+$ from Desal |
| Product | Amine-$HCl^-$ + $CO_2$ | Regenerated amine | Regenerated amine + NaCl |
| Exit Component | $CO_2$ (vent) <br> AmineHCl (send to the Base Swing comp) | Regenerated amine | Regenerated amine + NaCl (send to the desalination comp.) |

One of skill in the art would appreciate the components, supplements, and pH value are merely examples representative of a plurality of possible combinations capable of continuously removing carbon dioxide from a fluid continuously.

Figure 13:
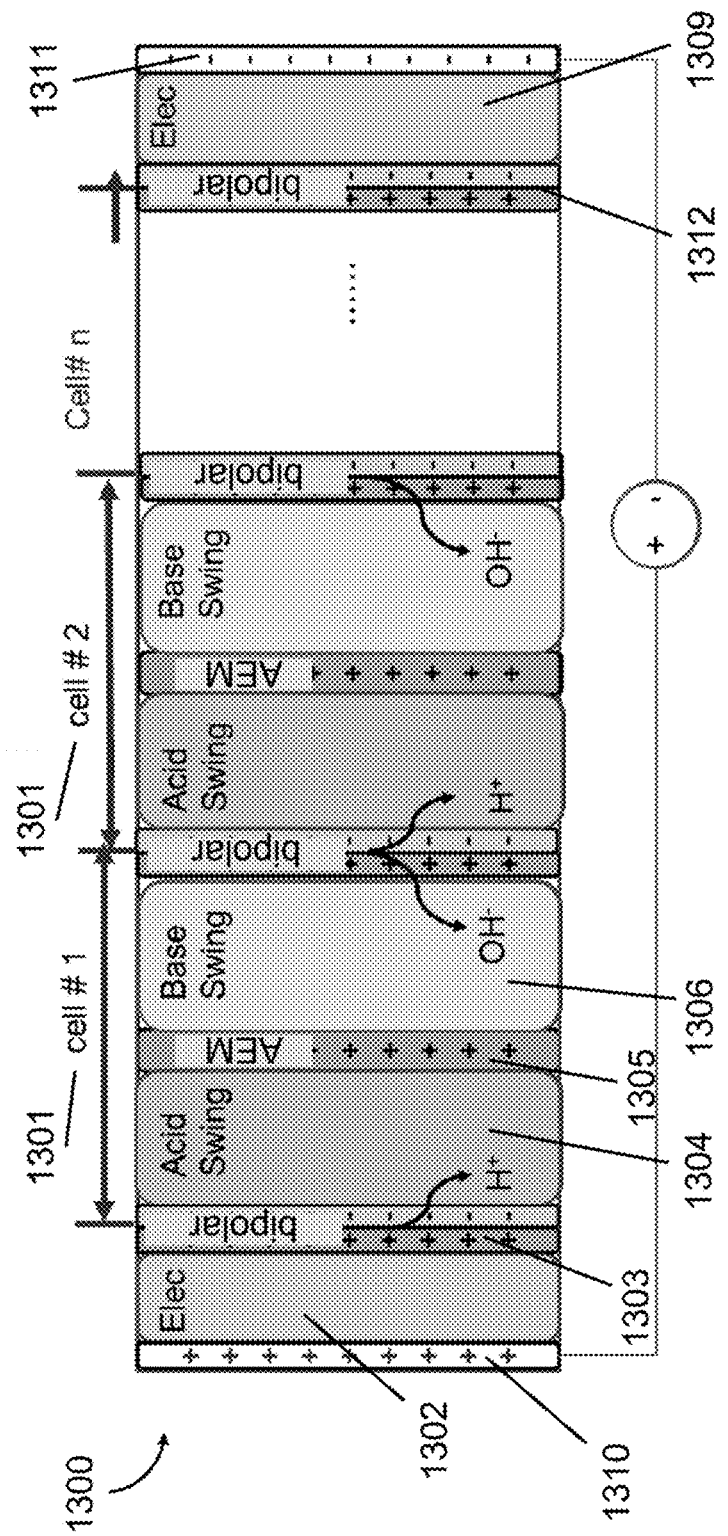
FIG. 13 is a schematic representation of an exemplary electrochemical cell stack configuration of a plurality of distinct two-compartment electrochemical cells, each comprising an acid swing chamber and base swing chamber.

Referring now to FIG. 13, an exemplary cell stack 1300 is shown in schematic view. In general, cell stack 1300 is configured similarly to cell stack 900. Cell stack 1300 shows a two-chambered configuration. Cell stack 1300 comprises an acid swing chamber 1304 and a base swing chamber 1306, separated by an anion exchange membrane 1305. A cathode 1310 is disposed in a cathode chamber 1302, and the cathode chamber 1302 is disposed adjacent to the acid swing chamber 1304. cathode chamber 1302 is separated from acid swing chamber 1304 by a bipolar membrane 1303. The acid swing chamber of a second cell 1301 is disposed adjacent to the base swing chamber 1306, separated therefrom by a bipolar membrane 1303. Cell stack 1300 may comprise three distinct cells 1301, but one of skill in the art would appreciate cell stack 1300 may include a plurality of cells. For example, and without limitation, cell stack 1300 may comprise two, four, five, ten, 100, 150, 200, 250, 300, 350, or 400 cells 1301. In certain preferred embodiments, cell stack 1300 comprises from about 100 to about 300 cells 1301. In certain such preferred embodiments, cell stack 1300 comprises about 100 cells 1301. In other preferred embodiments, cell stack 1300 comprises about 200 cells 1301. In other preferred embodiments, cell stack 1300 comprises about 300 cells 1301. Cell stack 1300 may, in certain preferred embodiments, include a bipolar membrane 404 to separate distinct cells. In various embodiments, each cell 1301 may be separated by walls configured to be anodes and/or cathodes. In some embodiments, due to adjacent anodic and cathodic chambers sharing anodes and cathodes, respectively, between distinct cells, the configuration of chambers in adjacent cells may vary. In preferred embodiments, the plurality of cells 1301, configured as set forth in FIG. 13, is disposed between an anode chamber 1302, comprising an anode 1310, and a cathode chamber 1309, comprising a cathode 1311. In certain such embodiments, each of the plurality of distinct cells 1301, the anode chamber 1302, and the cathode chamber 1309 are configured to be in fluid communication and in electrical communication. In certain embodiments, cell stack 1300 is used in place of cell stack 100 in an exemplary system of, e.g., FIG. 1.

EXAMPLES

The invention now being generally described, it will be more readily understood by reference to the following examples which are included merely for purposes of illustration of certain aspects and embodiments of the present invention and are not intended to limit the invention.

Example 1: Exemplary Experimental Setup for Five-Compartment Cell

TABLE S1 details of exemplary experiment setup for five-compartment cell $CO_2$ desorption and amine regeneration.

| Parameter | Condition | |
|---|---|---|
| Membrane Size | 15 cm² | |
| Electrode Size | 15 cm² (Pt) | |
| Current | Current = ~0.3 A | |
| Starting Solution (300 ml Each) | Acid Swing | 0.9M $CO_2$ Loaded Pz + 0.6M NaCl |
| | Base Swing | 0.9M Pz + 0.9M HCl + 0.6M NaCl |
| | Desalination | 0.9M Pz + 1.5M NaCl |
| | Anodic | 1M $H_2SO_4$ |
| | Cathodic | 1M NaOH |

Figure 10A:
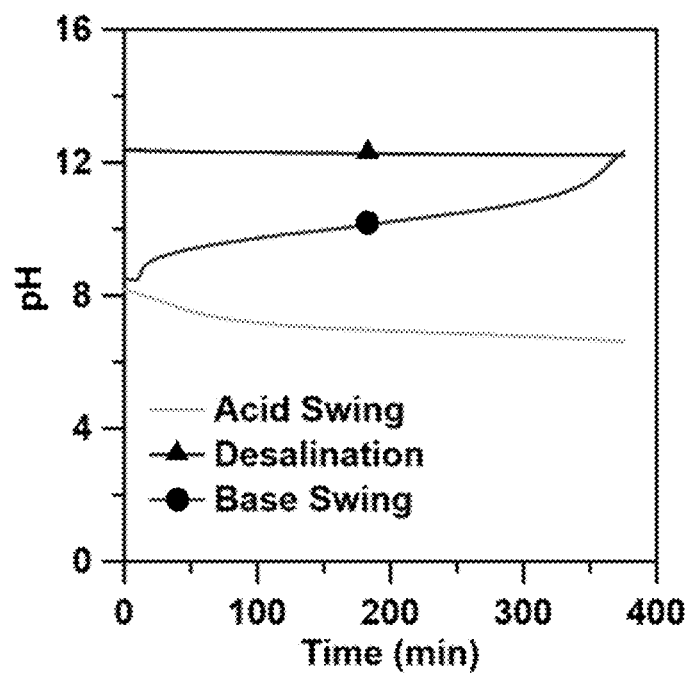
FIG. 10A is a plot displaying the measured pH over time of the acid swing, base swing, and desalination chambers of an exemplary five-chambered cell of the disclosure.
Figure 10B:
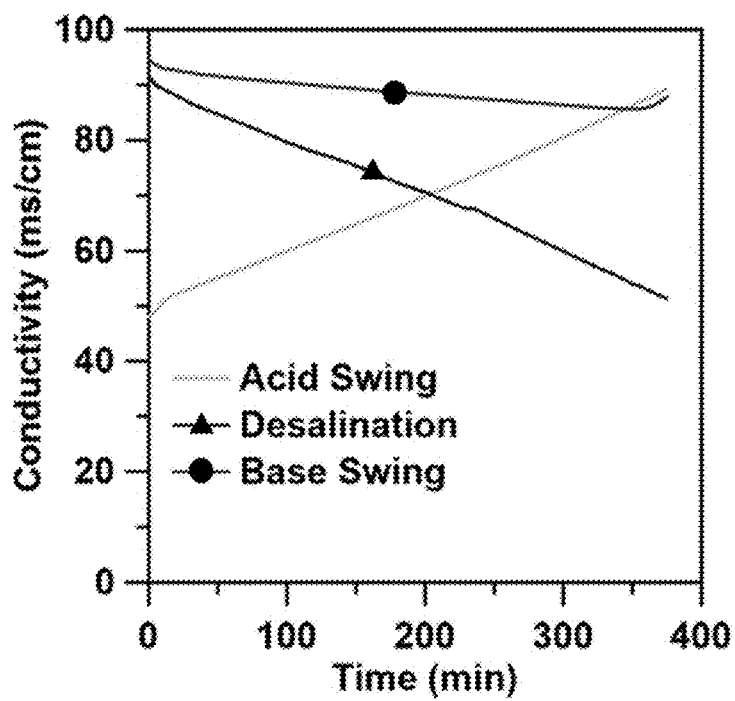
FIG. 10B is a plot displaying the measured conductivity over time of the acid swing, base swing, and desalination chambers of an exemplary five-compartment cell of the disclosure.

Results obtained with a five-membered cell of the disclosure using the setup described in Table S1 are given in e.g., FIGS. 10A and 10B. $CO_2$-loaded amine such as piperazine (PZ) solution with NaCl solution is added and placed in the acid swing compartment. Fresh PZ with 1.5M NaCl is placed in the desalination compartment. Fresh PZ with NaCl and HCl addition is placed in the base swing compartment. HCl addition to PZ is to mimic the product of the acid swing compartment, which serves as the starting solution of the base swing compartment. $H_2SO_4$ and NaOH solution is placed in anodic and cathodic compartment respectively. The detailed recipe is listed in the following table. The pH swing and conductivity results are shown in FIGS. 10A and 10B. It is shown that the five-compartment cell can regenerate acidified PZ in the base swing cell and acidified $CO_2$-loaded amine in the acid swing cell. A continuous amine regeneration can be done with this five-compartment stack using methods of the disclosure.

Example 2: Exemplary Experimental Setup for Three-Compartment Cell

TABLE S2 details of exemplary experiment setup for five-compartment cell $CO_2$ desorption and amine regeneration.

| Parameter | Condition | |
|---|---|---|
| Membrane Size | 15 cm$^2$ | |
| Electrode Size | 15 cm$^2$ (Pt) | |
| Current | Current = ~0.289 A | |
| Starting Solution (300 ml Each) | Acid Swing | 0.9M $CO_2$ Loaded Pz + 0.6M NaCl |
| | Base Swing | 0.9M Pz + 0.9M HCl + 0.6M NaCl |
| | Desalination | 0.9M Pz + 1.5M NaCl |

$CO_2$-loaded PZ solution with NaCl solution is added and placed in the acid swing compartment. Fresh PZ with 1.5M NaCl is placed in the desalination compartment. Fresh PZ with NaCl and HCl addition is placed in the base swing compartment. HCl addition to PZ is to mimic the product of the acid swing compartment, which serves as the starting solution of the base swing compartment. The detailed recipe is listed in the following table. The pH swing and conductivity results are shown in FIG. 4. It is shown that the three-compartment cell can regenerate acidified PZ in the base swing cell and acidified $CO_2$-loaded amine in the acid swing cell.

Example 3: Exemplary Procedures and Protocols for $CO_2$ Capture Sorbent Regeneration Regeneration of a $CO_2$ sorbent using a system of the disclosure may be performed according to the following procedural steps:

1. Place the starting solution in each compartment. (Exemplary starting solutions of each cell or cell stack configuration may be found in, e.g., Table S3-S8)
2. Turn on a DC power supply and set the current to the target current density (exemplary current densities for each test are listed in, e.g., Table S3-S8)
3. Run the electrochemical cell until the $CO_2$ capture absorbent solution is fully regenerated. The absorbent solution is considered essentially regenerated when the pH value of the solution in the base swing compartment reaches approximately the pH value of fresh absorbent.

Tables S3-S8 contain various details and parameters that will be useful in selecting and using systems and methods of the disclosure:

TABLE S3

Exemplary configurations of systems of the disclosure

| | Configuration #1 | Configuration #2 | Configuration #3 |
|---|---|---|---|
| Starting Solution | | | |
| Anode | 0.5M H2SO4 | 0.5M H2SO4 | 0.5M H2SO4 |
| Acid Swing | 0.9M CO2 Loaded PZ solution | 0.9M CO2 Loaded PZ solution with 1.5M NaCl | 0.9M CO2 Loaded PZ solution with 1.5M NaCl |
| Desalination | N/A | N/A | N/A |
| Base Swing | 0.9M PZ with 0.9M HCl | 0.9M PZ with 0.9M HCl | 0.9M PZ with 0.9M HCl |
| Cathode | 0.5M NaOH | 0.5M NaOH | 0.5M NaOH |
| Amine CO2 Loading Method | 5% CO2 loaded to saturation | 5% CO2 loaded to saturation | 5% CO2 loaded to saturation |
| Repeating Unit number | N/A | N/A | 2 |
| Amine Usage | 0.9M Piperazine | 0.9M Piperazine | 0.9M Piperazine |
| Operating Current Density | 20 mA/cm^2 | 20 mA/cm^2 | 20 mA/cm^2 |
| Membrane Usage | | | |
| Cation Exchange Membrane | FKS-PET-130 | FKS-PET-130 | FKS-PET-130 |
| Anion Exchange Membrane | FAB-PK-130 | FAB-PK-130 | FAB-PK-130 |
| BipolarMembrane | N/A | N/A | FBM-PK |

TABLE S4

Exemplary configurations of systems of the disclosure, cont'd.

| | Configuration #4 | Configuration #5 | Configuration #6 |
|---|---|---|---|
| Starting Solution | | | |
| Anode | 0.5M NaOH | 0.5M H2SO4 | 0.5M KOH |
| Acid Swing | 0.9M CO2 Loaded PZ solution with 0.6M NaCl | 0.9M CO2 Loaded PZ solution with 0.6M NaCl | 1M CO2 Loaded KOH + 0.3M K2SO4 |
| Desalination | 0.9M PZ with 1.5M NaCl | 0.9M PZ with 1.5M NaCl | Na/A |

TABLE S4-continued

Exemplary configurations of systems of the disclosure, cont'd.

|  | Configuration #4 | Configuration #5 | Configuration #6 |
| --- | --- | --- | --- |
| Base Swing | 0.9M PZ with 0.9M HCl & 0.6M NaCl | 0.9M PZ with 0.9M HCl & 0.6M NaCl | 0.1M KOH |
| Cathode | 0.5M NaOH | 0.5M NaOH | 0.5M KOH |
| Amine CO2 Loading Method | 5% CO2 loaded to saturation | 5% CO2 loaded to saturation | Air CO2 loading to Saturation |
| Repeating Unit number | 9 | 6 | 15 |
| Amine Usage | 0.9M Piperazine | 0.9M Piperazine | 1M KOH |
| Operating Current Density | 20 mA/cm^2 | 20 mA/cm^2 | 20 mA/cm^2 |
| Membrane Usage |  |  |  |
| Cation Exchange Membrane | FKS-PET-130 | Fujifilm type 10 CEM | Fujifilm type 10 CEM |
| Anion Exchange Membrane | FAB-PK-130 | Fujifilm type 10 AEM | Fujifilm type 10 AEM |
| Bipolar Membrane | FBM-PK | FBM-PK | FBM-PK |

The data contained in Tables S3 and S4 represent optimized configurations of certain preferred embodiments of systems and methods of the disclosure. Of these, configurations 4, 5, and 6 represent certain more preferred embodiments. Further experimental setups for these particular configurations (4, 5, and 6) are given below:

TABLE S5

Exemplary variations of preferred configuration #4.

|  | Configuration #4 | Configuration #4 | Configuration #4 | Configuration #4 |
| --- | --- | --- | --- | --- |
| Starting Solution |  |  |  |  |
| Anode | 0.5M NaOH | 0.5M NaOH | 0.5M NaOH | 0.5M NaOH |
| Acid Swing | 0.9M CO2 Loaded PZ solution with 0.6M NaCl | 1.8M CO2 Loaded PZ solution with 0.6M NaCl | 0.9M CO2 Loaded PZ solution with 0.6M NaCl | 0.9M CO2 Loaded PZ solution with 0.6M NaCl |
| Desalination | 0.9M PZ with 1.5M NaCl | 1.8M PZ with 2.4M NaCl | 0.9M PZ with 1.5M NaCl | 0.9M PZ with 1.5M NaCl |
| Base Swing | 0.9M PZ with 0.9M HCl & 0.6M NaCl | 1.8M PZ with 0.9M HCl & 0.6M NaCl | 0.9M PZ with 0.9M HCl & 0.6M NaCl | 0.9M PZ with 0.9M HCl & 0.6M NaCl |
| Cathode | 0.5M NaOH | 0.5M NaOH | 0.5M NaOH | 0.5M NaOH |
| Amine CO2 Loading Method | 5% CO2 loaded to saturation | 5% CO2 loaded to saturation | 5% CO2 loaded to saturation | 5% CO2 loaded to saturation |
| Repeating Unit number | 9 | 6 | 6 | 9 |
| Amine Usage | 0.9M Piperazine | 1.8M Piperazine | 0.9M Piperazine | 0.9M Piperazine |
| Operating Current Density | 20 mA/cm^2 | 20 mA/cm^2 | 20 mA/cm^2 | 20 mA/cm^2 |
| Membrane Usage |  |  |  |  |
| Cation Exchange Membrane | FKS-PET-130 | FKS-PET-130 | FKS-PET-130 | Fujifilm CEM type 10 |
| Anion Exchange Membrane | FAB-PK-130 | FAB-PK-130 | FAB-PK-130 | Fujifilm AEM type 10 |
| Bipolar Membrane | FBM-PK | FBM-PK | FBM-PK | FBM-PK |

TABLE S6

Exemplary variations of preferred configuration #5.

| | Configuration #5 | Configuration #5 |
|---|---|---|
| Starting Solution | | |
| Anode | 0.5M H2SO4 | 0.5M H2SO4 |
| Acid Swing | 0.9M CO2 Loaded PZ solution with 0.6M NaCl | 0.9M CO2 Loaded PZ solution with 0.6M NaCl |
| Desalination | 0.9M PZ with 1.5M NaCl | 0.9M PZ with 1.5M NaCl |
| Base Swing | 0.9M PZ with 0.9M HCl & 0.6M NaCl | 0.9M PZ with 0.9M HCl & 0.6M NaCl |
| Cathode | 0.5M NaOH | 0.5M NaOH |
| Amine CO2 Loading Method | 5% CO2 loaded to saturation | 5% CO2 loaded to saturation |
| Repeating Unit number | 6 | 6 |
| Amine Usage | 0.9M Piperazine | 0.9M Piperazine |
| Operating Current Density | 20 mA/cm^2 | 20 mA/cm^2 |
| Membrane Usage | | |
| Cation Exchange Membrane | Fujifilm type 10 CEM | FKS-PET-130 |
| Anion Exchange Membrane | Fujifilm type 10 AEM | FAB-PK-130 |
| Bipolar Membrane | FBM-PK | FBM-PK |

TABLE S7

Exemplary variations of preferred configuration #6.

| | Configuration #6 | Configuration #6 | Configuration #6 |
|---|---|---|---|
| Starting Solution | | | |
| Anode | 0.5M KOH | 0.5M KOH | 0.5M KOH |
| Acid Swing | 1M CO2 Loaded KOH + 0.3M K2SO4 | 1M CO2 Loaded KOH + 0.3M K2SO4 | 1M CO2 Loaded KOH + 0.3M K2SO4 |
| Desalination | Na/A | Na/A | Na/A |
| Base Swing | 0.1M KOH | 0.1M KOH | 0.1M KOH |
| Cathode | 0.5M KOH | 0.5M KOH | 0.5M KOH |
| Amine CO2 Loading Method | Air CO2 loading to Saturation | Air CO2 loading to Saturation | Air CO2 loading to Saturation |
| Repeating Unit number | 15 | 9 | 9 |
| Amine Usage | 1M KOH | 1M KOH | 1M KOH |
| Operating Current Density | 20 mA/cm^2 | 20 mA/cm^2 | 20 mA/cm^2 |
| Membrane Usage | | | |
| Cation Exchange Membrane | CEM Fujifilm | CEM Fujifilm | CEM Fujifilm |
| Anion Exchange Membrane | type 10 | type 10 | type 10 |
| Bipolar Membrane | FBM-PK | FBM-PK | FBM-PK |

TABLE S8

Exemplary variations of preferred configuration #6 cont'd.

| | Configuration #6 | Configuration #6 | Configuration #6 | Configuration #6 |
|---|---|---|---|---|
| Starting Solution | | | | |
| Anode | 0.5M KOH | 0.5M KOH | 0.5M KOH | 0.5M KOH |
| Acid Swing | 2M CO2 Loaded KOH + 0.3M K2SO4 | 1M CO2 Loaded KOH | 2M CO2 Loaded KOH + 0.3M K2SO4 | 2M CO2 Loaded KOH + 0.3M K2SO4 |
| Desalination | Na/A | Na/A | Na/A | Na/A |
| Base Swing | 0.1M KOH | 0.1M KOH | 0.1M KOH | 0.1M KOH |
| Cathode | 0.5M KOH | 0.5M KOH | 0.5M KOH | 0.5M KOH |
| Amine CO2 Loading Method | Air CO2 loading to Saturation | Air CO2 loading to Saturation | Air CO2 loading to Saturation | Air CO2 loading to Saturation |
| Repeating Unit number | 6 | 6 | 6 | 3 |
| Amine Usage | 2M KOH | 1M KOH | 2M KOH | 2M KOH |
| Operating Current Density | 20 mA/cm^2 | 20 mA/cm^2 | 20 mA/cm^2 | 20 mA/cm^2 |

TABLE S8-continued

Exemplary variations of preferred configuration #6 cont'd.

| | Configuration #6 | Configuration #6 | Configuration #6 | Configuration #6 |
|---|---|---|---|---|
| Membrane Usage | | | | |
| Cation Exchange Membrane | Fujifilm type 10 CEM | Fujifilm type 10 CEM | Fujifilm type 10 CEM | Fujifilm type 10 CEM |
| Anion Exchange Membrane | | | | |
| Bipolar Membrane | FBM-PK | FBM-PK | FBM-PK | FBM-PK |

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A system for carbon dioxide removal comprising:
a first electrochemical cell comprising:
a first acid swing chamber disposed at a first end of the first electrochemical cell;
a first base swing chamber disposed at a second end of the first electrochemical cell and in fluid communication with the first acid swing chamber;
a first anodic chamber, comprising an anode, disposed adjacent to the first end of the first electrochemical cell, separated therefrom by a first bipolar exchange membrane; and
a first cathodic chamber, comprising a cathode, adjacent to the second end of the first electrochemical cell, separated therefrom by a second bipolar exchange membrane;
a first salt chamber in fluid communication with the first acid swing chamber;
a second salt chamber in fluid communication with the first acid swing chamber and the first base swing chamber; and
a third salt chamber in fluid communication with the first base swing chamber,
wherein the first electrochemical cell, the first anodic chamber, and the first cathodic chamber are in fluid and electrical communication; and
the first salt chamber is configured to provide a first aqueous salt solution comprising a salt and $CO_2$ to the first acid swing chamber;
the second salt chamber is configured to transfer a second aqueous salt solution comprising the salt, $CO_2$, and protons from the first acid swing chamber to the first base swing chamber; and
the third salt chamber is configured to remove a third aqueous salt solution comprising the salt from the first base swing chamber.

2. The system of claim 1, wherein the system comprises a plurality of distinct electrochemical cells configured to be in fluid communication and electrically connected.

3. The system of claim 2, wherein each of the plurality of distinct electrochemical cells are separated by a dividing bipolar membrane.

4. The system of claim 3, wherein each of the plurality of distinct electrochemical cells is configured such that:
the first base swing chamber, disposed at the second end of the first electrochemical cell, is disposed adjacent to a first face of the dividing bipolar membrane;
a second acid swing chamber, disposed at a first end of a second electrochemical cell, is disposed adjacent to a second face of the dividing bipolar membrane; and
the first base swing chamber of the first electrochemical cell is in fluid communication with the second acid swing chamber of the second electrochemical cell.

5. The system of claim 2, wherein the anode is disposed at a first end of the plurality of distinct electrochemical cells, and the cathode is disposed at a second end of the plurality of distinct electrochemical cells, and the cathode, the anode, and the plurality of distinct electrochemical cells form a closed circuit.

6. The system of claim 2, wherein the plurality of distinct electrochemical cells comprises from about 2 to about 500 distinct electrochemical cells.

7. The system of claim 6, wherein the plurality of distinct electrochemical cells comprises from about 100 to about 200 distinct electrochemical cells.

8. The system of claim 6, wherein the plurality of distinct electrochemical cells comprises about 100 distinct electrochemical cells.

9. The system of claim 6, wherein the plurality of distinct electrochemical cells comprises about 150 distinct electrochemical cells.

10. The system of claim 6, wherein the plurality of distinct electrochemical cells comprises about 200 distinct electrochemical cells.

11. The system of claim 1, wherein the system comprises at least one pump.

12. The system of claim 1, further comprising a desalination chamber in fluid communication with the first acid swing chamber, the first base swing chamber, and the third salt chamber, wherein the third salt chamber is configured to remove the third aqueous salt solution from the base swing chamber and provide the third aqueous salt solution to the desalination chamber.

13. The system of claim 1, wherein the first aqueous salt solution, the second aqueous salt solution, and the third aqueous salt solution each comprise a salt of at least one alkali element.

14. The system of claim 13, wherein the salt of at least one alkali element is selected from LiOH, NaOH, KOH, $Li_2O$, $Na_2O$, $K_2O$, and combinations thereof.

15. The system of claim 13, wherein the salt of at least one alkali element is NaOH.

\* \* \* \* \*